(12) United States Patent
Medemblik

(10) Patent No.: US 7,540,398 B2
(45) Date of Patent: Jun. 2, 2009

(54) GATING SYSTEM FOR A TRANSPORT VEHICLE

(75) Inventor: John J. Medemblik, Guelph (CA)

(73) Assignee: Walinga Inc., Guelph, Ontario (CA)

( * ) Notice: Subject to any disclaimer, the term of this patent is extended or adjusted under 35 U.S.C. 154(b) by 672 days.

(21) Appl. No.: 10/795,362

(22) Filed: Mar. 9, 2004

(65) Prior Publication Data

US 2004/0178233 A1    Sep. 16, 2004

(51) Int. Cl.
    *B65D 47/00* (2006.01)
(52) U.S. Cl. ............... 222/561; 222/625; 105/282.3; 160/37
(58) Field of Classification Search ............ 222/556, 222/505, 561, 504, 310, 625, 624; 160/37, 160/201, 31, 43, 229.1; 105/240, 305, 280, 105/282.2, 282.3; 251/901; 239/676, 682, 239/687

See application file for complete search history.

(56) References Cited

U.S. PATENT DOCUMENTS

| | | | | |
|---|---|---|---|---|
| 3,241,730 A | * | 3/1966 | Dorey | 222/505 |
| 3,631,812 A | * | 1/1972 | Winslow, Jr. | 105/240 |
| 4,094,254 A | * | 6/1978 | Koranda | 105/282.3 |
| 4,951,992 A | * | 8/1990 | Hockney | 296/204 |
| 5,288,017 A | * | 2/1994 | Halovitz | 239/687 |
| 5,443,300 A | * | 8/1995 | Mohammed | 160/37 |
| 5,447,187 A | * | 9/1995 | Gustafson | 160/40 |
| 2003/0173040 A1 | * | 9/2003 | Court et al. | 160/37 |

* cited by examiner

*Primary Examiner*—Lien T Ngo
(74) *Attorney, Agent, or Firm*—Daryl W. Schnurr

(57) ABSTRACT

A gate assembly for a hopper of a transport vehicle has an open position in which the gate lies substantially in a vertical plane adjacent to the hopper wall and a closed position in which the gate lies substantially in a horizontal plane. The gate moves longitudinally in guides between the two planes. Several gates can be located adjacent to one another to retain or discharge particulate material in several hoppers separated by partition walls.

20 Claims, 24 Drawing Sheets

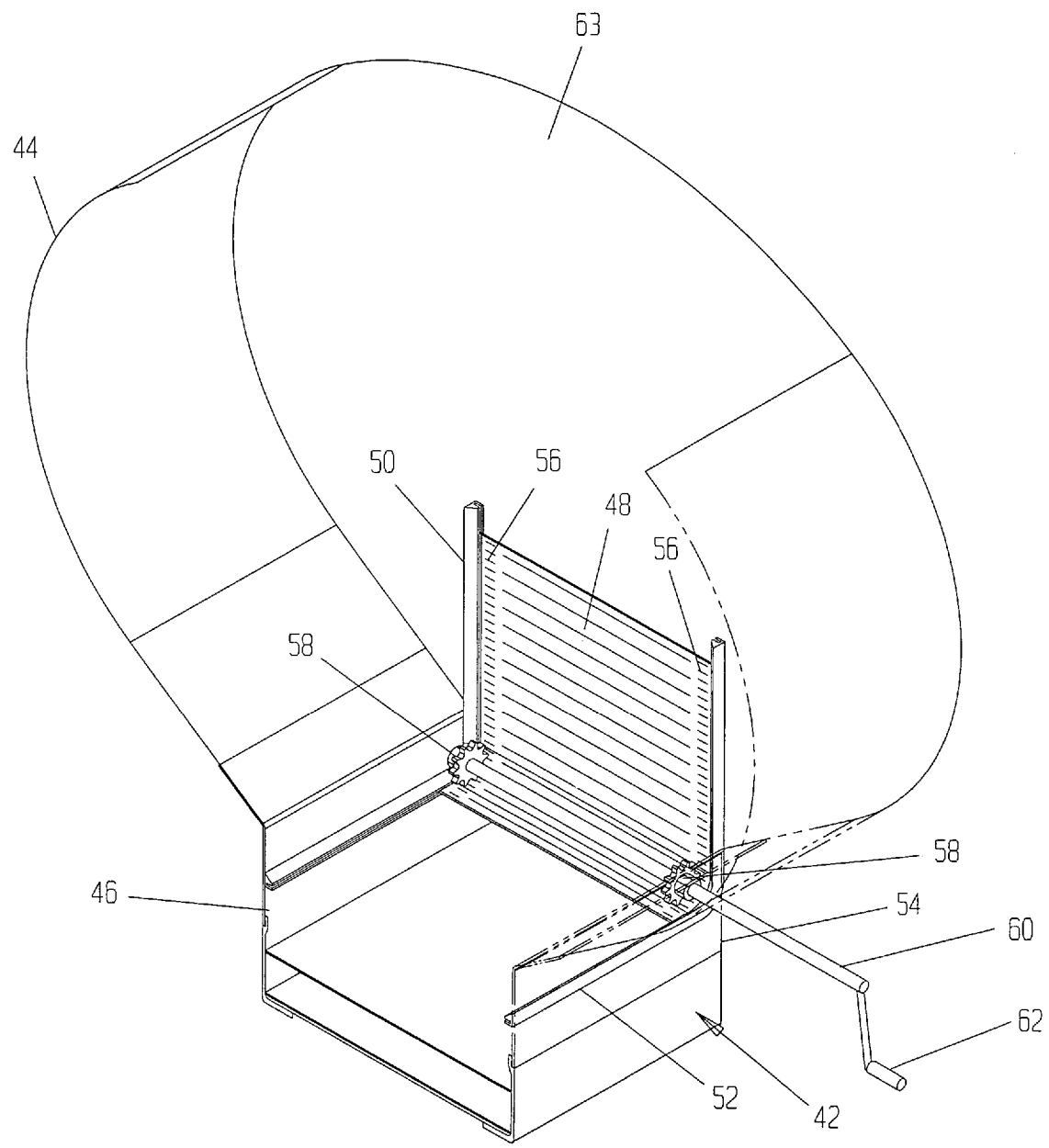

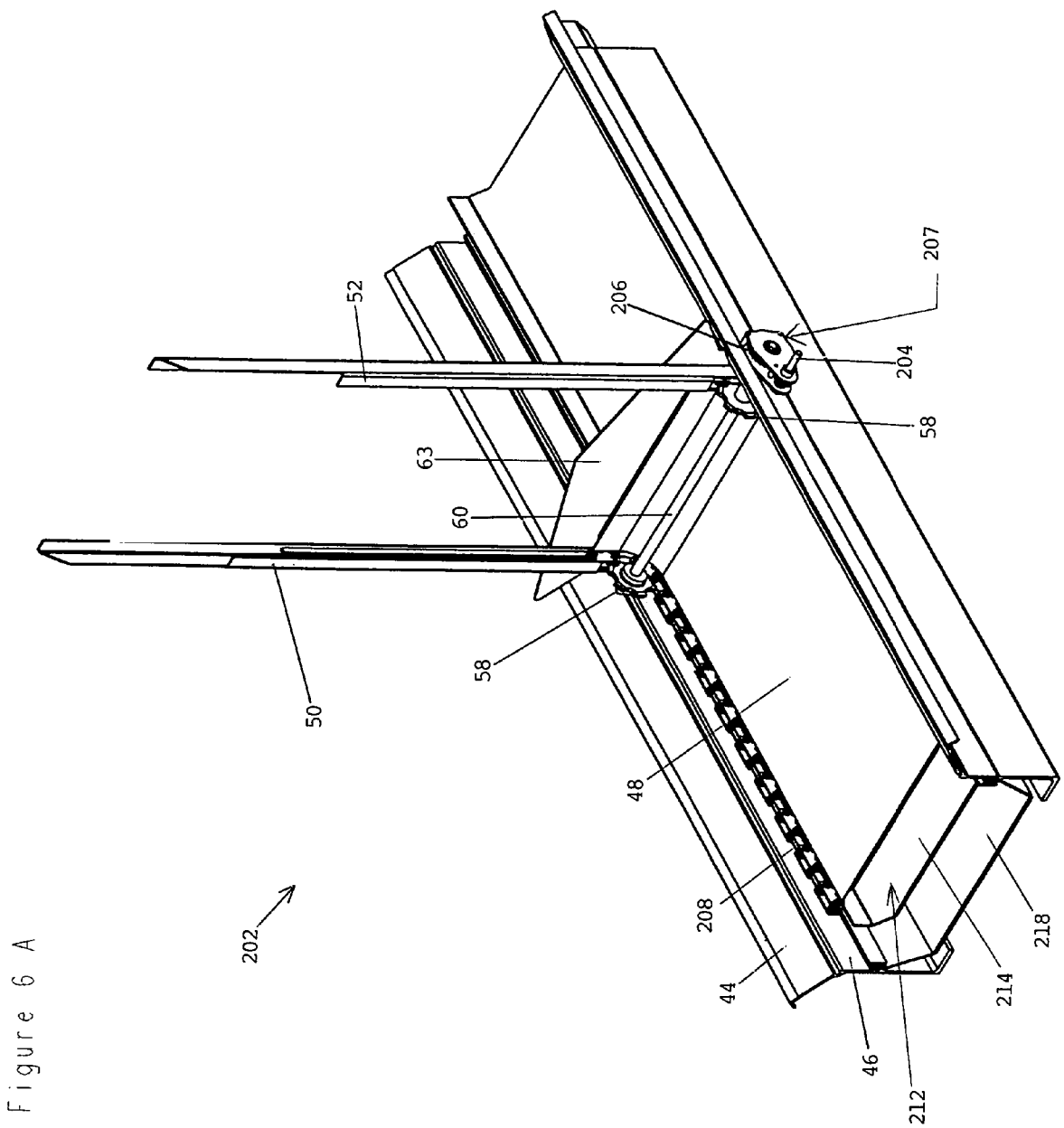

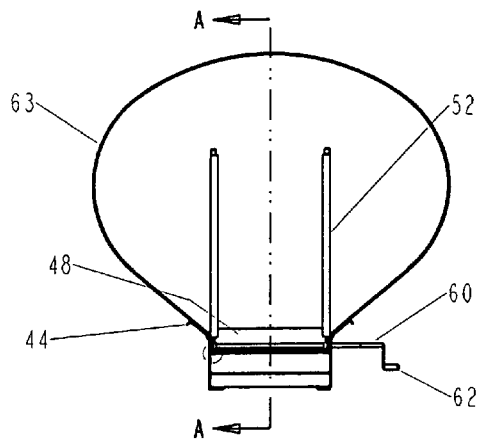
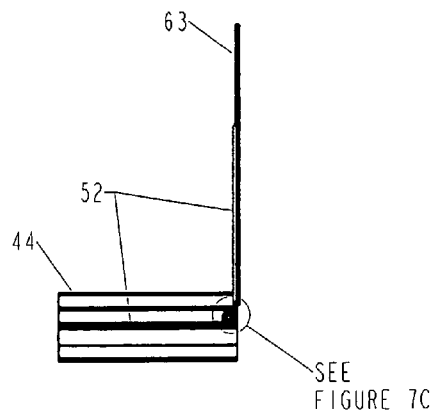
FIGURE 7A
FIGURE 7B
SECTION A-A
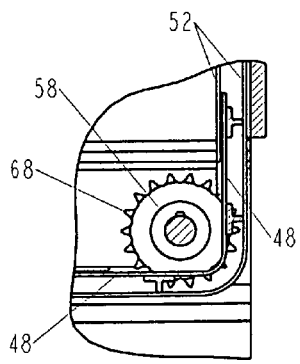
FIGURE 7C
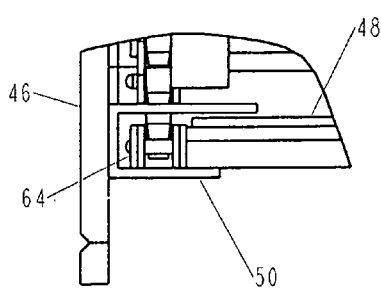
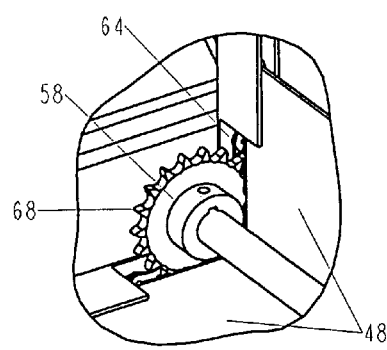
FIGURE 7D
FIGURE 7E

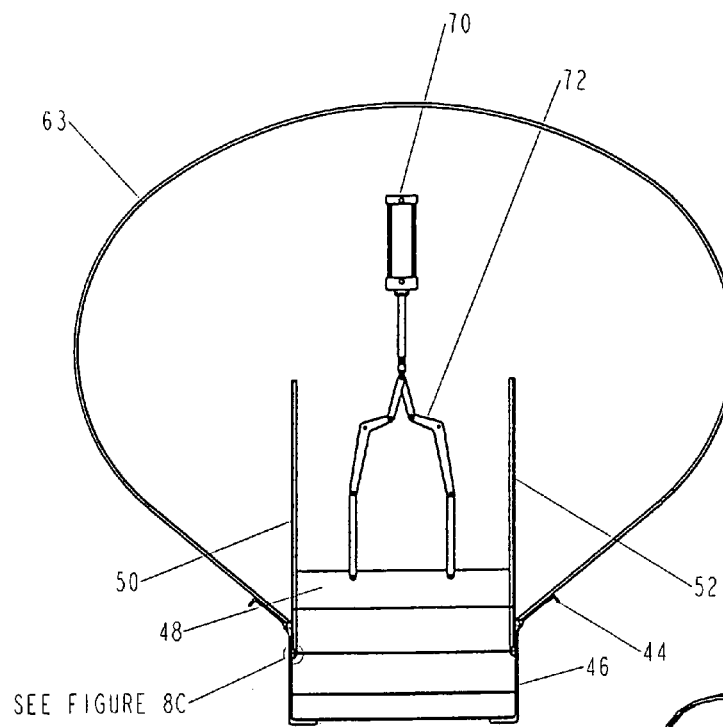
FIGURE 8A
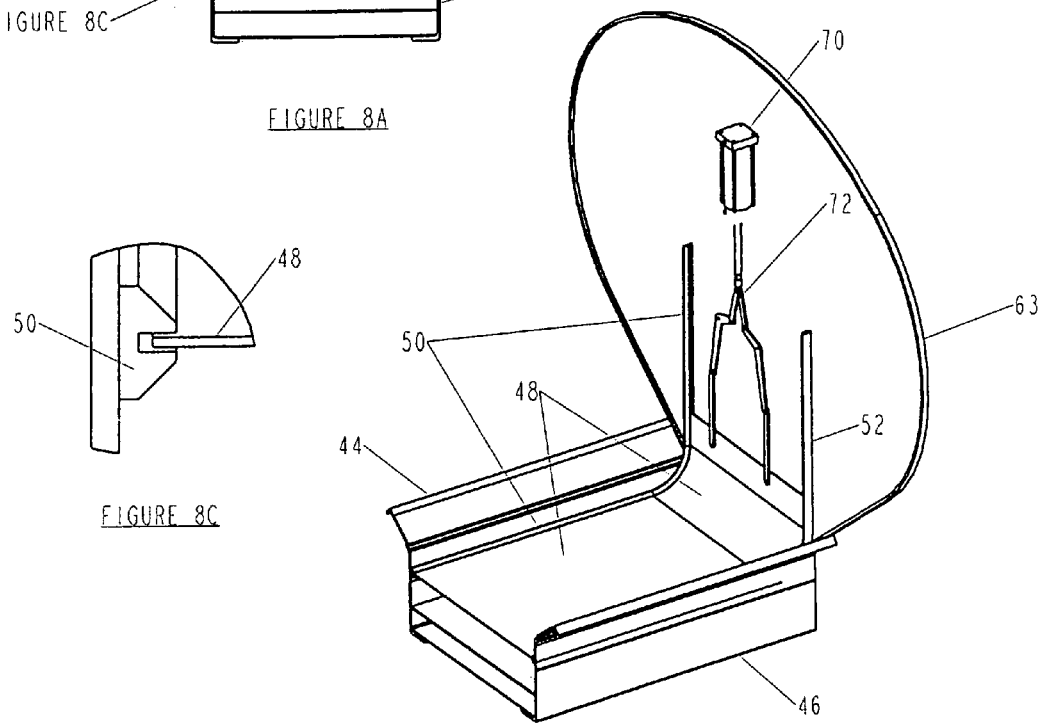
FIGURE 8C
FIGURE 8B

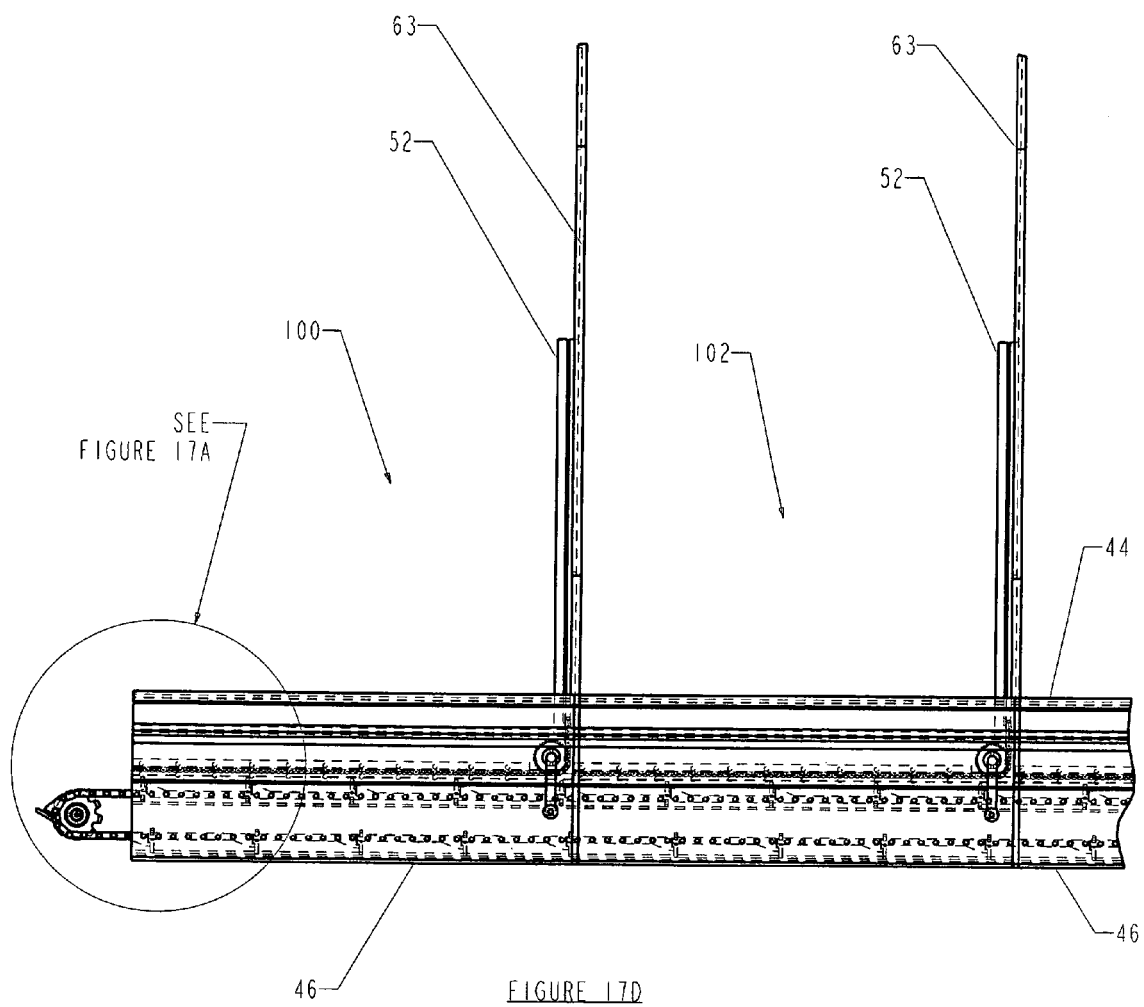

GATING SYSTEM FOR A TRANSPORT VEHICLE

BACKGROUND OF THE INVENTION

1. Field of the Invention

This invention relates to a gate assembly for a hopper of a transport vehicle and, more particularly, to a gate assembly having a gate that moves longitudinally along guides from a first plane in a closed position to a second plane in an open position.

2. Description of the Prior Art

Gate assemblies for transport trailers and other vehicles are known. Previous gate assemblies do not provide a sufficiently large opening, or they are difficult to operate, or they occupy too much space, or the opening is much smaller than the footprint when the assembly is in the open position, or the particulate material passing through the gate assembly is subject to contamination due to the design of the assembly.

In FIG. 1, there are shown two prior art manual drop gates 2 operated by a crank 4. When the crank is turned in an appropriate direction, the gates open and particulate material from a hopper 6 falls by gravity into a channel 8 containing an auger (not shown) or other means for transporting the particulate material. The opening provided by the drop gates is too narrow and restrictive for efficient flow of materials where the materials are not free flowing. The drop gates 2 block part of the opening.

In FIG. 2, there is shown a prior art transverse gate 12 that is flat and is moved between a closed position (as shown) and an open position by means of a rack 14 and pinion 16. The gate can be moved entirely to one side of the transport vehicle in the open position or, alternatively, the gate can be split in half with a rack and pinion on each side of the hopper to move each half of the gate outward when the gate is being opened and inward when the gate is being closed. While the gate provides a larger opening than the drop gates shown in FIG. 1, the transverse gate 12 opens into an exterior of the hopper. This can lead to spillage of material if the area between the open gate and the hopper is not adequately sealed or if the seals become worn and also exposes the gates to the ambient air. This can risk contamination of the bulk material (not shown) within the hopper. Also, depending on the weather conditions, the gate can become stuck in a particular position.

In FIG. 3, there is shown a prior art longitudinal gate assembly 20 where there are three gates 22, 24, 26 located adjacent to one another in the gate assembly 20. When, for example, gate 22 is opened, it will slide on top of or beneath gate 24. Similarly, when gate 24 is opened, it will slide on top or beneath gate 26. When gate 26 is opened, it will slide on top or beneath an adjacent plate 28. Each of the gates 22, 24, 26 has a separate compartment or hopper (not shown), which can be filled with bulk material. Usually the gate that is being opened slides beneath an adjacent gate. The difficulty arises when the hopper for gate 26, for example, is filled with bulk material and the gate is flexed downward due to the weight of that material. As a result, the gate 24 can therefore be difficult to open or close and sometimes cannot be opened or closed as it cannot slide beneath the gate 26. Each of the gates 22, 24, 26 has a crank 30 thereon. The gate assembly 20 does not permit the use of different gate sizes. Also, when gate 22 is in the open position, since gate 22 slides beneath gate 24, if it were desired to open gates 24 simultaneously with gate 22, gate 22 will be blocking most of the opening of gate 24.

In FIGS. 4 and 5, there are shown prior art vertically inclined slide gates 32, 34 respectively. Gate 32 is opened by an air operated cylinder 36 and gate 34 is opened and closed by a rack and pinion 38 with a crank 40. As can be seen from the drawings, in an open position, the gates are pulled upward into an inverted V position providing an opening through which materials can flow into the discharge area 8. These gates function well when the materials are free flowing, but the openings are not large enough to permit the flow of bulky non-free flowing products. Since these gates operate within the interior of the hopper, risk of contamination of materials is reduced.

SUMMARY OF THE INVENTION

It is an object of the present invention to provide a gate assembly where the gate is substantially removed from an opening when the gate is in an open position. It is a further object of the present invention to provide a gate assembly where the gate is enclosed within a hopper in an open position and in a closed position.

A gate assembly for a hopper of a transport vehicle, the hopper containing particulate material, comprises a frame supporting a gate. The gate has two side edges and the frame has two opposing sides with guides thereon, each guide extending along one of the opposing sides. The guides are sized to receive the edges of the gate, there being one edge in each guide. The guides extend upwards at one end of the frame. The gate is rigid enough to support the particulate material when the gate is in a closed position, yet flexible enough to move longitudinally between a first plane in the closed position and a second plane in an open position.

A gate assembly for a hopper of a transport vehicle, the hopper containing particulate material comprises a frame supporting a gate. The frame has two opposing sides with guides thereon. The gate has two side edges and the guides are sized to receive the edges of the gate. The guides extend upward at one end of the frame. The gate is rigid longitudinally and flexible laterally to enable the gate to move within the guides between a closed position substantially in a first plane and an open position substantially in a second plane.

A gate assembly for a hopper of a transport vehicle, the hopper containing particulate material, comprises a frame supporting a gate. The frame has two opposing sides with guides thereon. The gate has two side edges and two ends. The guides are each sized to receive one of the side edges of the gate. The guides extend upward from one end of the frame. A first end of the two ends is a leading edge as the gate is being opened and a second end of the two ends is a leading edge as the gate is being closed, the edges being moveable within the guides.

A gate assembly for a hopper of a transport vehicle, the hopper containing particulate material, comprises a frame supporting a gate. The frame has two opposing sides with guides thereon. The gate has two side edges and two ends. Each guide is sized to receive one side edge of the gate. The guides extend upward from one end of the frame. Each of the guides extends along one of the opposing sides. The gate is rigid enough to support the particulate material when the gate is closed, yet flexible enough to move longitudinally relative to the guides to a closed position and an open position.

BRIEF DESCRIPTION OF THE DRAWINGS

FIG. 6, there is shown a schematic partial perspective view of a gate assembly in accordance with the present invention;

FIG. 6A is a partial perspective view of a further embodiment of a multi-gate assembly having a reduction drive to open and close the gate;

FIG. 7A is a schematic front view of the gate assembly of FIG. 6;

FIG. 7B is a schematic sectional side view along the section A-A of FIG. 7A;

FIG. 7C is an enlarged side view of a sprocket portion of the gate assembly;

FIG. 7D is an enlarged front view of part of the gate assembly shown in FIG. 6;

FIG. 7E is a partial perspective view of a sprocket shown in FIG. 6;

FIG. 8A is a partial front view of a gate assembly that is operable by an air cylinder with a gate in a closed position;

FIG. 8B is a schematic perspective view of the gate assembly of FIG. 8A;

FIG. 8C is an enlarged partial perspective view of an edge of a gate in a guide;

FIG. 17D is a schematic partial side view of the gate assembly of FIG. 16;

DESCRIPTION OF A PREFERRED EMBODIMENT

Figure 1:
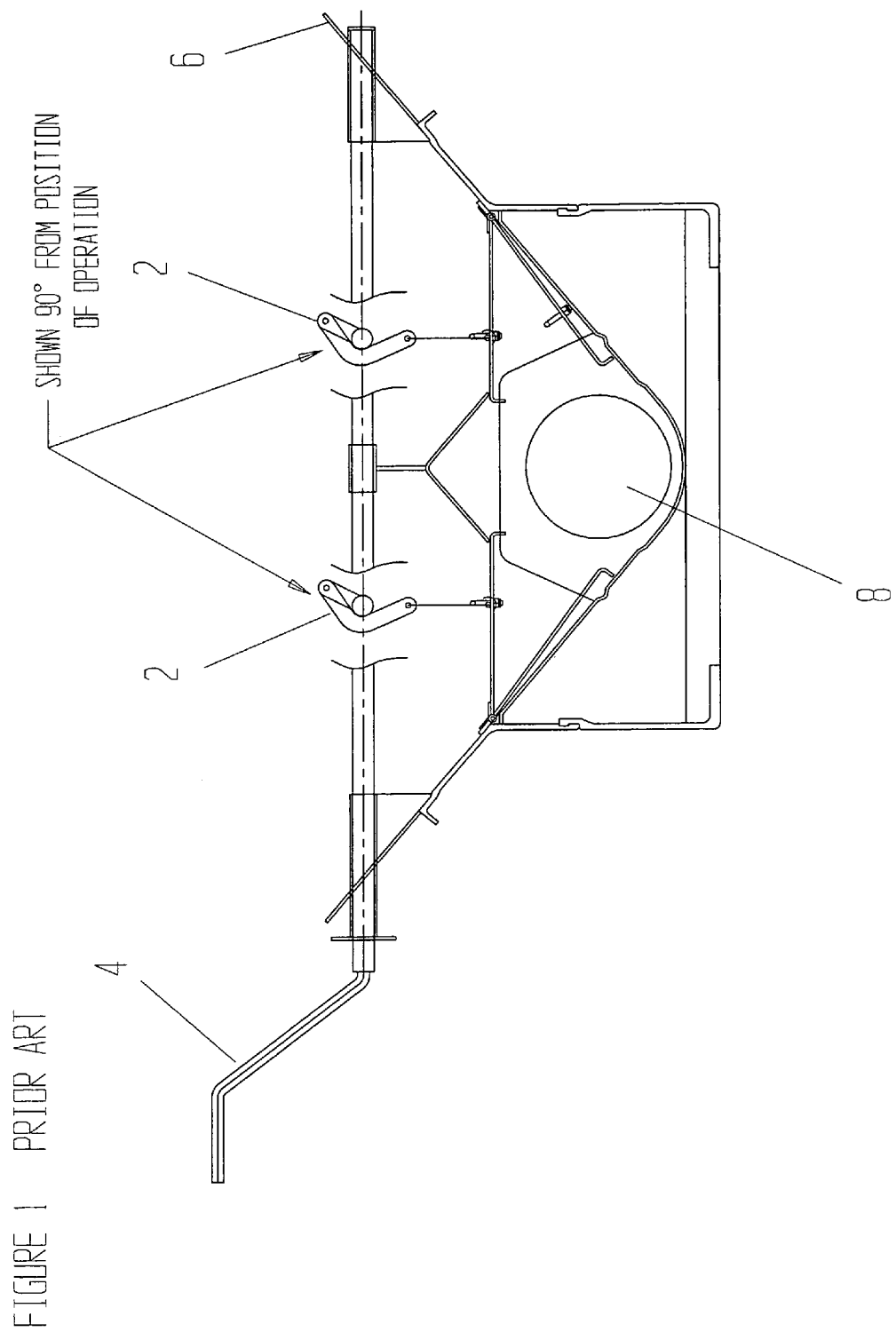
FIG. 1 is a schematic end view of a prior art drop gate.
Figure 2:
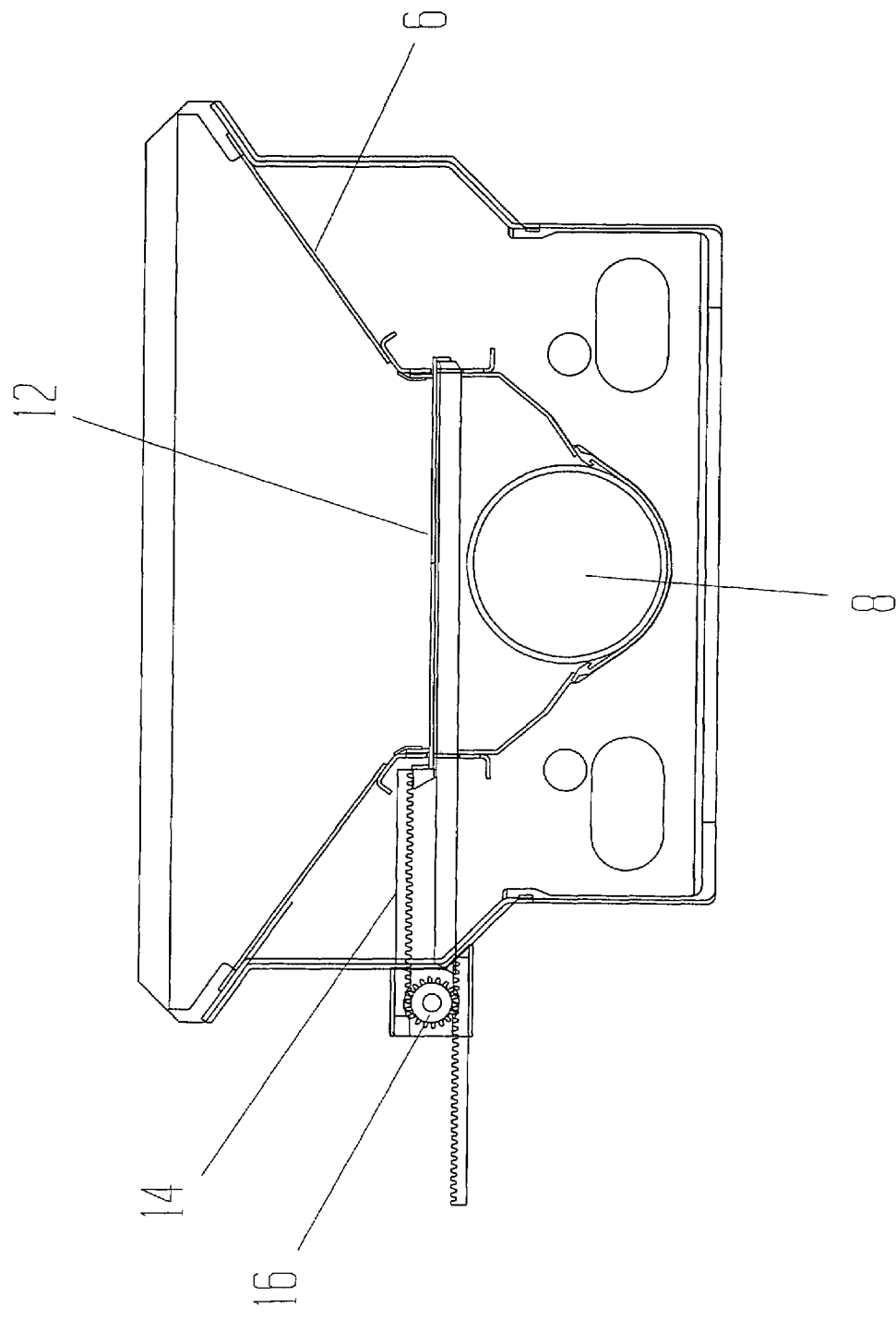
FIG. 2 is a schematic end view of a prior art transverse horizontal slide gate.
Figure 3:
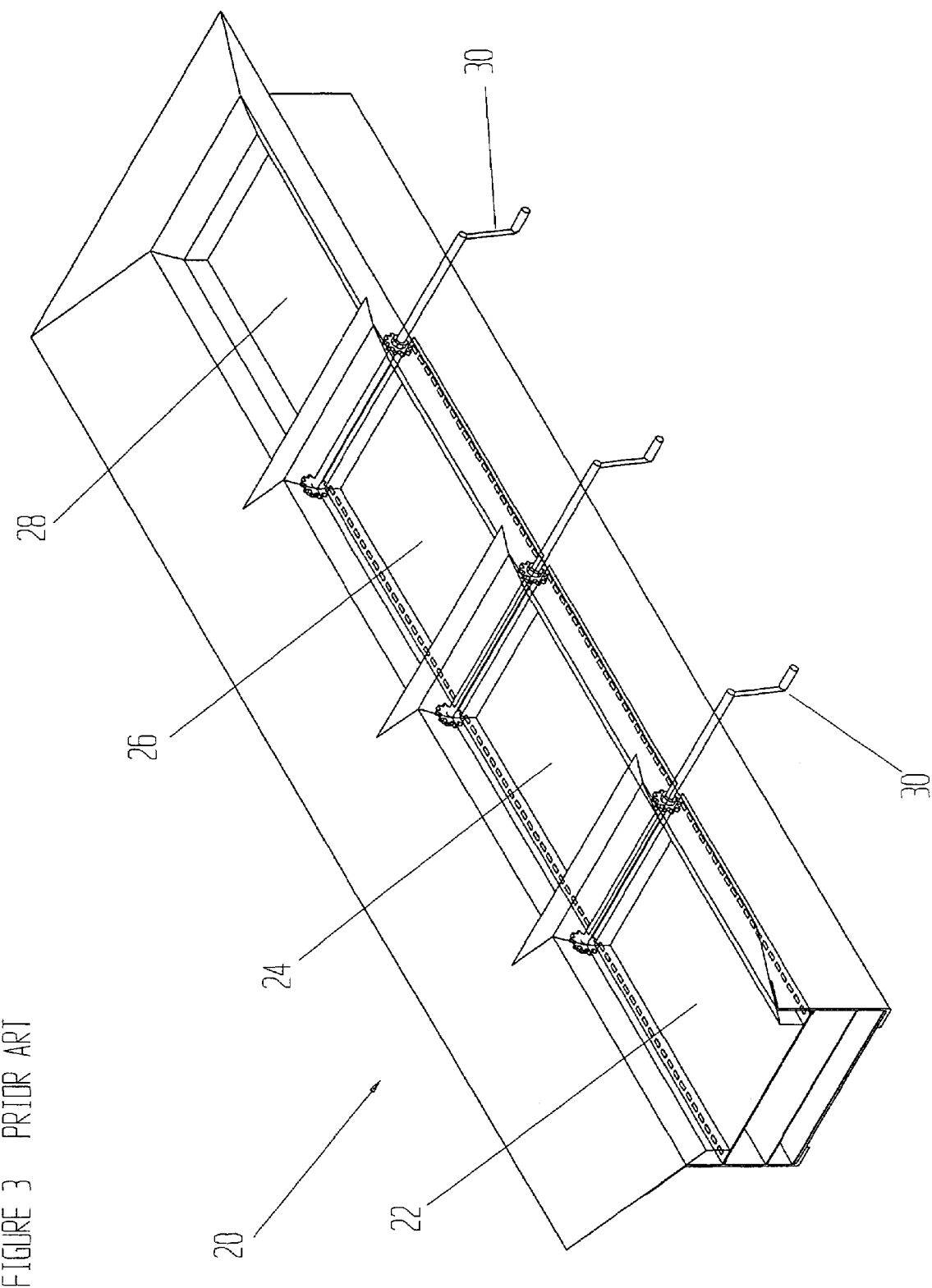
FIG. 3 is a perspective view of a prior art longitudinal horizontal slide gate.
Figure 4:
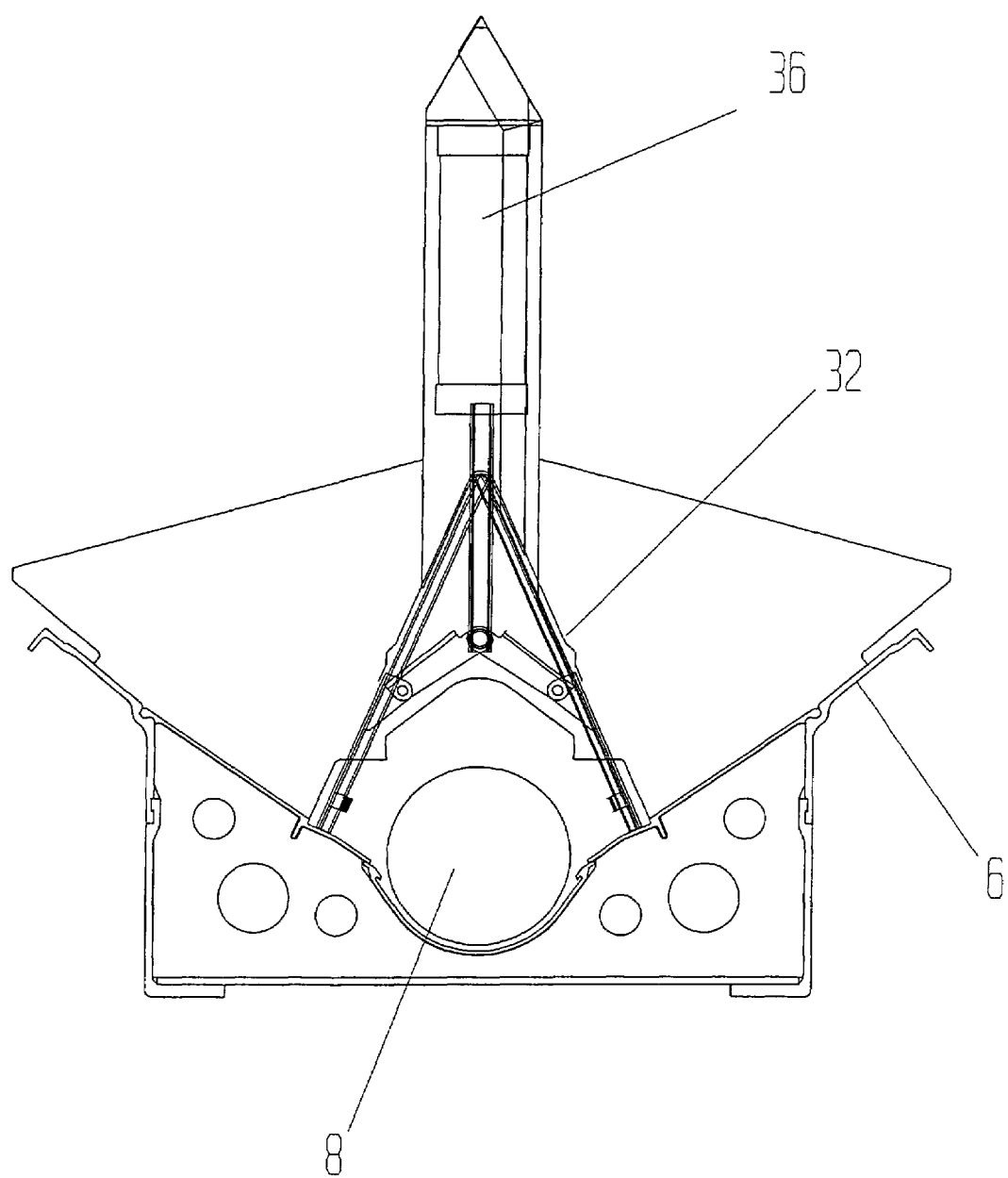
FIG. 4 is a schematic end view of a prior art vertically inclined slide gate operated by an air cylinder.
Figure 5:
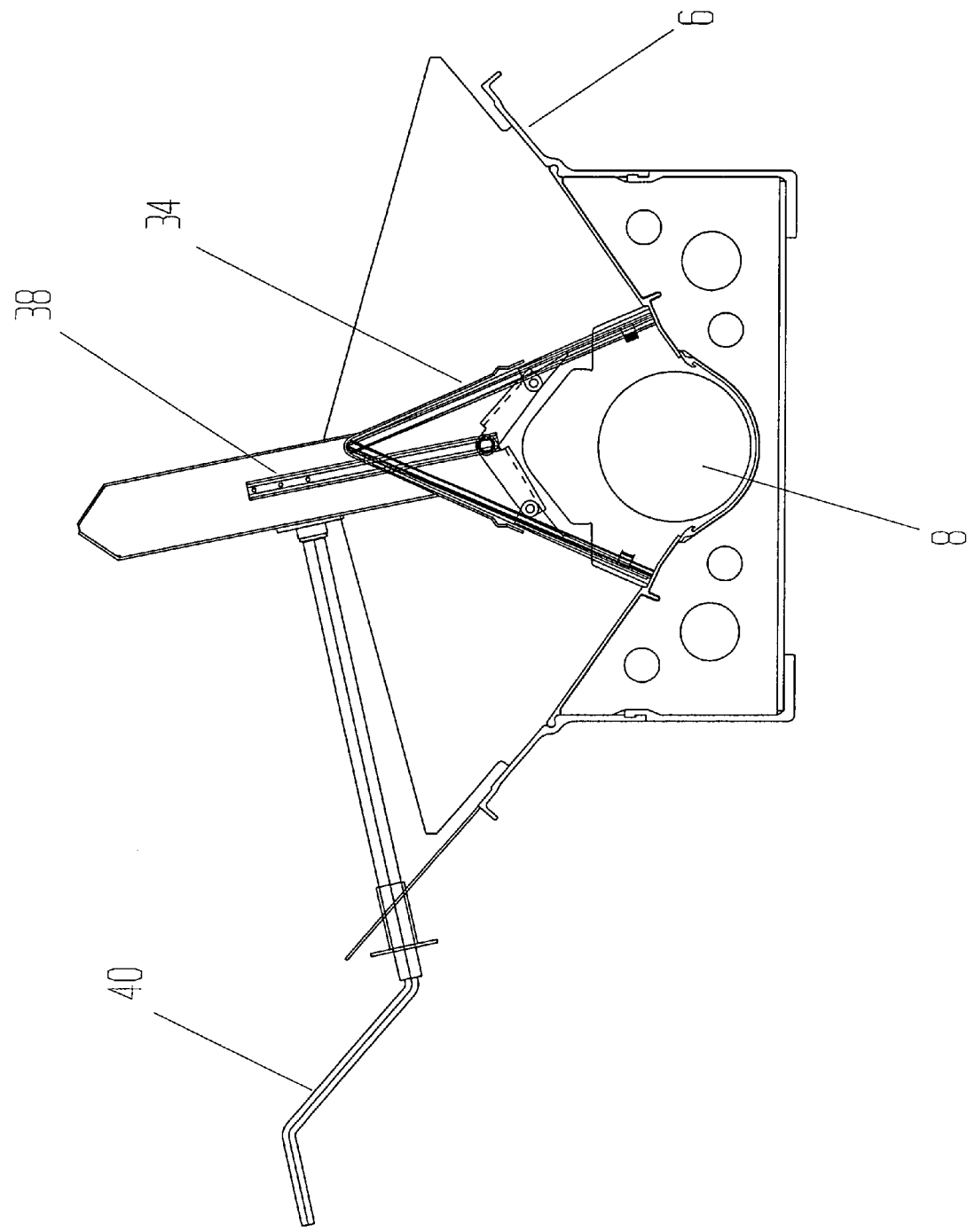
FIG. 5 is a schematic end view of a prior art vertically inclined slide gate operated by a rack and pinion.

In FIG. 6, a gate assembly 42 is located at a base of a hopper 44. The assembly 42 has a frame 46 supporting a gate 48. The frame has two opposing sides with channels 50, 52 thereon. The channels are sized to slidably receive an edge of said gate 48. The gate 48 has two side edges and two ends. The channels are guides and the edges of the gate move within the channels 50, 52. Other guides of various types can be used. For example, the guides can contain rollers to assist the edges in moving within the guides. Further, guides can contain chains to interact with edges of the gate to move the gate within the guides. The channels 50, 52 extend along said frame 46 and curving smoothly upward at an end 54 of said frame 46. The gate 48 is made of a material that is rigid enough to support particulate material within the hopper 44 when the gate 48 is closed, yet flexible enough to move longitudinally from a first plane in a closed position to a second plane in an open position. In FIG. 6, the gate 48 is shown in the open position. The first plane is a horizontal plane through a horizontal portion of the channels 50, 52. The second plane is a vertical plane located between the vertical portions of the channels 50, 52. The two planes are 90° apart from one another. The gate 48 has grooves 56 along its side edges to receive projections of sprockets 58. The sprockets are mounted on a shaft 60 having a crank 62. The rotation of the crank moves the gate 48 from the open position shown to the closed position (not shown). It can be seen that even in the open position, a bottom portion of the gate 48 is curved around the sprockets so that a lower portion of the gate is not located in the vertical plane. The gate shown in FIG. 6 is not in a fully open position. When it is fully open, the lower edge of the gate 48 will be directly beneath the shaft 60. The gate of the present invention is stored (in the open position) along a divider 63 or end wall of the compartment that the gate assembly serves. Preferably, the guides have an abutment therein (not shown) to limit the distance that the gate can open.

Figure 6B:
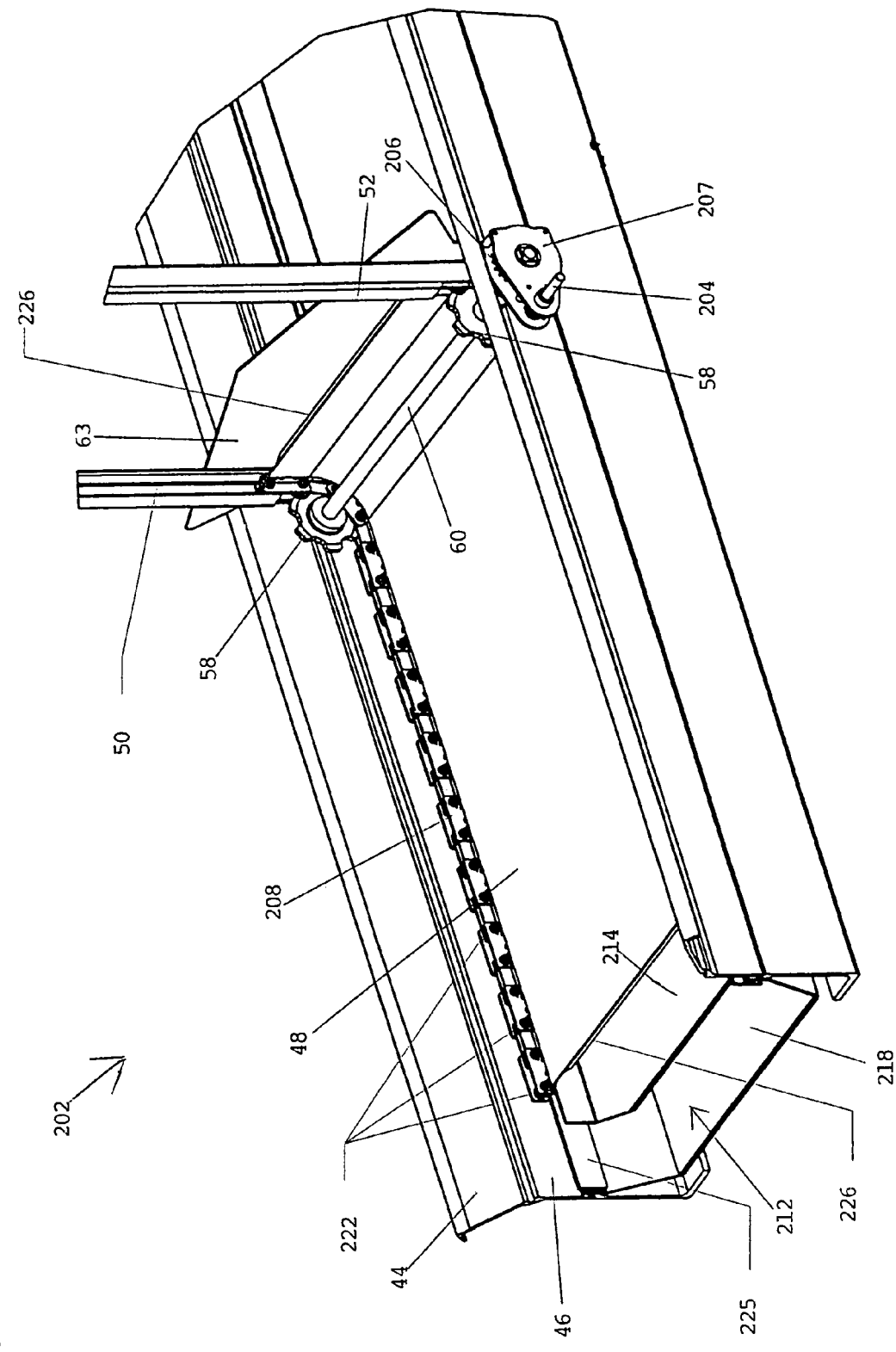
FIG. 6B is a further partial perspective view of the gate assembly shown in FIG. 6A.
Figure 6C:
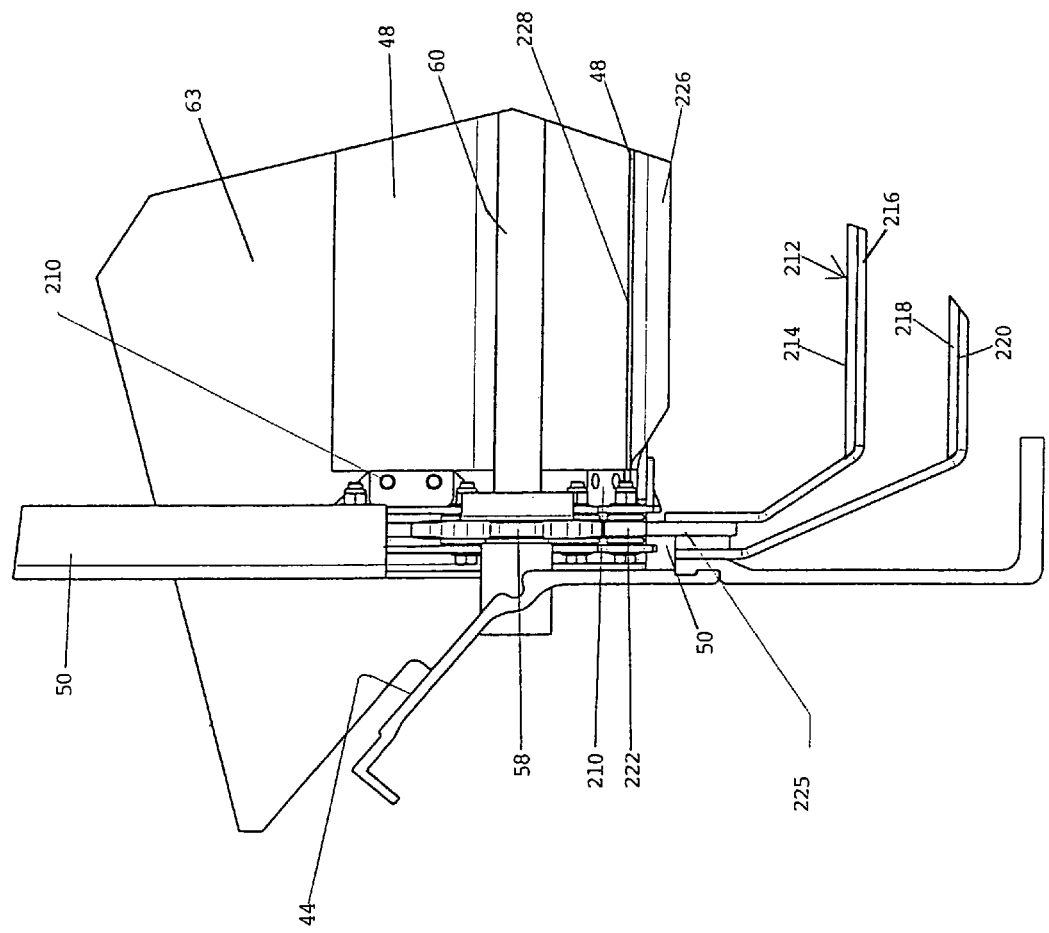
FIG. 6C is a partial front view of one side of the gate assembly of FIG. 6A.

In FIGS. 6A and 6B, there is shown a partial perspective view of a multi-gate system 202 as a further embodiment of the present invention. The multi-gate system 202 has a post 204 that is shaped to receive a crank (not shown in FIGS. 6A and 6B). The post is rotatably connected by a small chain 206 to a large gear (not shown). The post 204 has a small gear (not shown) mounted thereon to drive the small chain 206 and, in turn, to drive the large gear, thereby making it easier to open and close the gate by applying less torque. The post and gear assembly is a reduction drive 207. The same reference numerals are used in FIGS. 6A, 6B and 6C as those used in FIG. 6 for those components that are substantially identical. The side edges of the gate 48 have large chains 208 thereon having links that fit within the prongs of the sprockets 58. In FIG. 6C, it can be seen that the large chain 208 is connected to a side edge of the gate 48 by gate supports 210. As the shaft 60 is rotated, the sprockets 58 rotate and cause the gate 48 to open or close depending on the direction of rotation of the sprockets 58.

Beneath the gate 48 is a conveyor 212. The conveyor 212 can be a belt, a drag or any other suitable type of conveyor. The conveyor 212 is continuous and has an upper portion 214 that is supported by an upper support 216 and a lower portion 218 that is supported by a lower support 220. The chain 208 has rollers 222 thereon to make it easier for the gate to move within the guide 50, 52. The guides each have a gate rail 225. When the gate is open, particulate matter (not shown) will fall through the gate onto the conveyor 212 where it will be transported to a desired location. The gate 48 has lateral supports 226 connected thereto (only one of which is shown in FIG. 6C). An L-shaped bracket has been deleted from FIGS. 6A, 6B and 6C to expose the large chain 208. The baffle bracket (not shown) extends inwardly from each side of the hopper 44 and then downwardly to a surface 228 of the gate 48. Preferably, an inner lower edge of the baffle will be in contact with the surface 228 of the gate 48 as the gate opens or closes and as the gate remains stationery. The purpose of the baffle is to prevent particulate matter from escaping around the side edges of the gate when the gate is in a closed position. There are openings within the links of the chain 208 as well as openings between the gate supports 210 through which particulate matter could escape if no baffle was in place. The baffle is designed to close off these openings. Preferably, the baffle or, at least the portion of the baffle that contacts the gate 48 is made of a slippery material that slides easily relative to the gate 48.

The gate assembly of the present invention fits within the footprint of the compartment being served whether the gate is opened or closed. In usage, a shield of cover (not shown) will be installed to protect the sprockets and that part of the guides that extend along the divider. The cover has been deleted for ease of illustration. Compartments of a transport vehicle can be sized as desired as the gate assembly can be made smaller or larger to fit the size of the compartment with which the gate is used.

The same reference numerals are used in FIGS. 7A to 7E to describe those components that are identical to the components of FIG. 6 without further description, unless otherwise indicated. In FIGS. 7C and 7E, the gate 48 is in a partially open position and it can be seen that part of the gate is in a vertical plane and part of the gate is in a horizontal plane. In FIGS. 7D and 7E, it can be seen that there is a linked chain 64 with openings (not shown) to receive projections 68 of the sprocket 58.

Figure 8D:
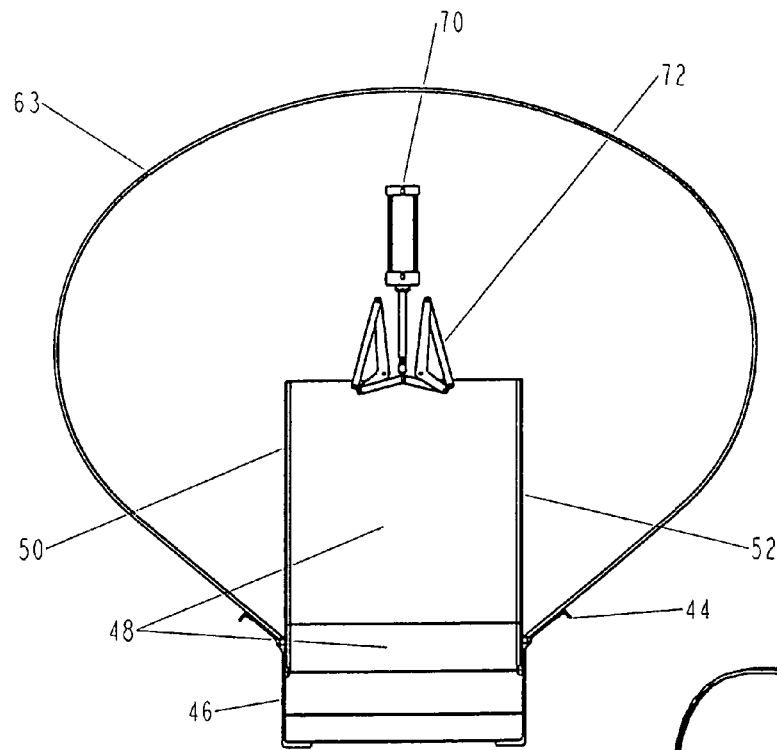
FIG. 8D is a schematic front view of the gate assembly of FIG. 8A where the gate is in an open position.
Figure 8E:
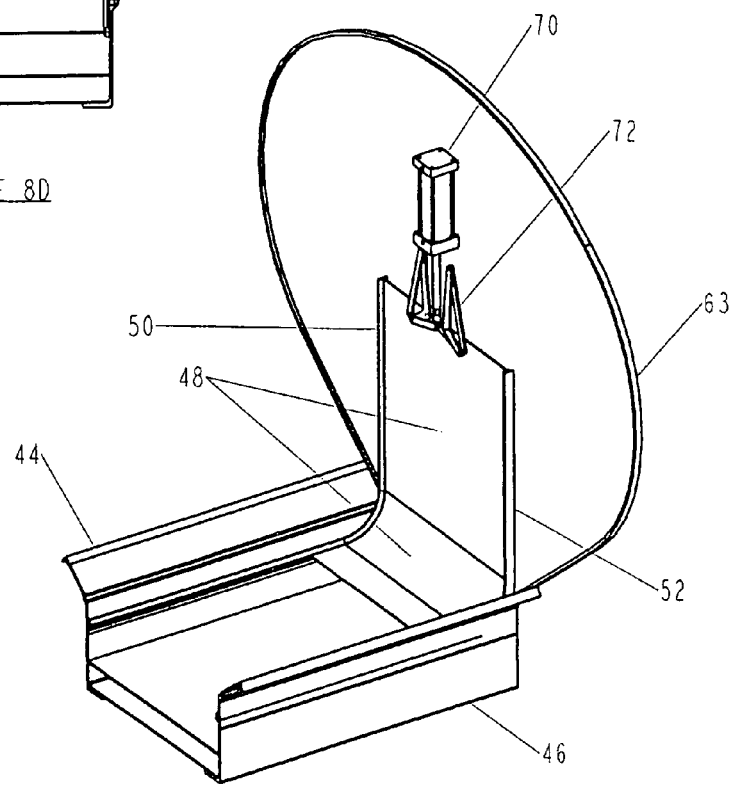
FIG. 8E is a schematic perspective view of the gate assembly of FIG. 8D.
Figure 9:
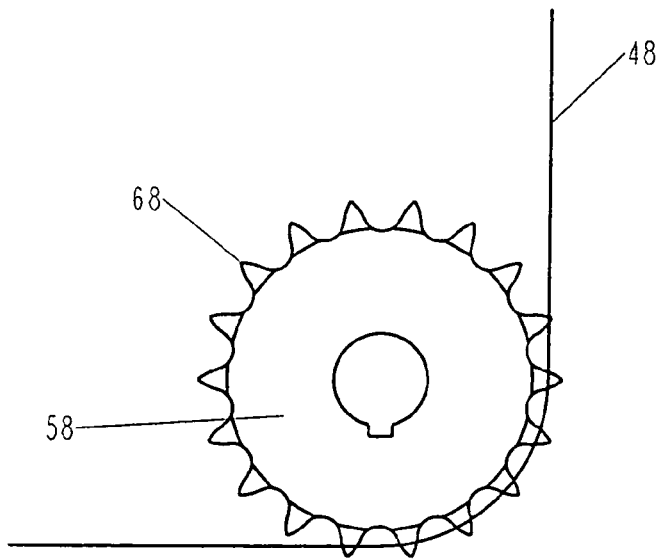
FIG. 9 is a schematic side view of a sprocket layout for a gate assembly.
Figure 10:
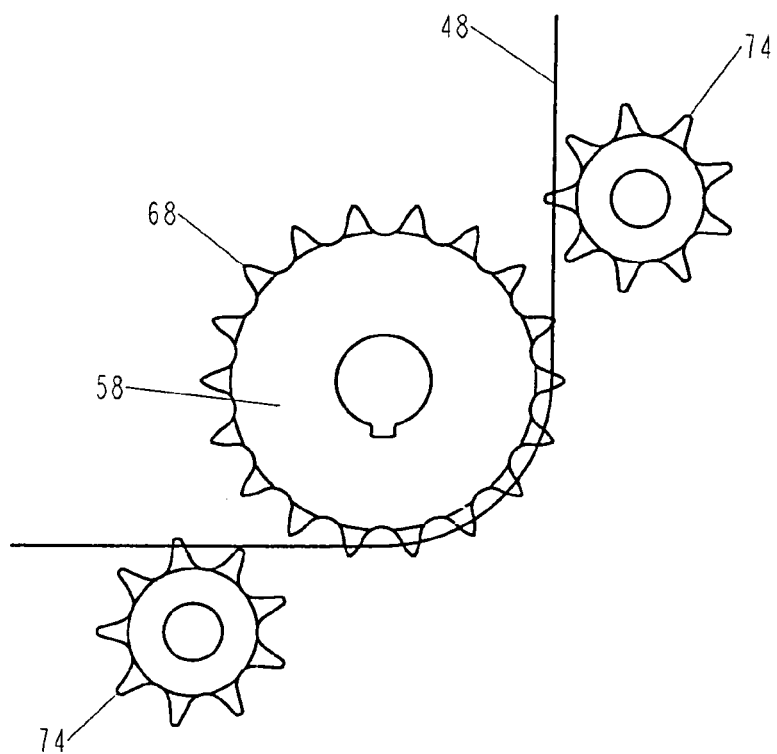
FIG. 10 is a schematic side view of an alternate sprocket layout for a gate assembly.

In FIGS. 8A to 8F, there is shown a further embodiment of the gate 48 which opens and closes by means of an air cylinder 70 connected to a hinge assembly 72. In FIGS. 8A and 8B, the gate 48 is in a closed position, and in FIGS. 8D and 8E, the gate 48 is in an open position. In FIG. 8C, it can be seen that the edge of the gate 48 slides within the guide 50. The same reference numerals are used in FIGS. 8A to 8F as those used in FIGS. 7A to 7E to describe those components that are identical. In FIG. 9, there is shown a schematic side view of the projections 68 of the sprocket 58 engaging the gate 48. In FIG. 10, there is shown a schematic side view a further embodiment of the sprocket arrangement for the sprocket 58 with two additional sprockets 74. The additional sprockets 74 provide further stability to the gate 48 but are not essential.

Figure 11A:
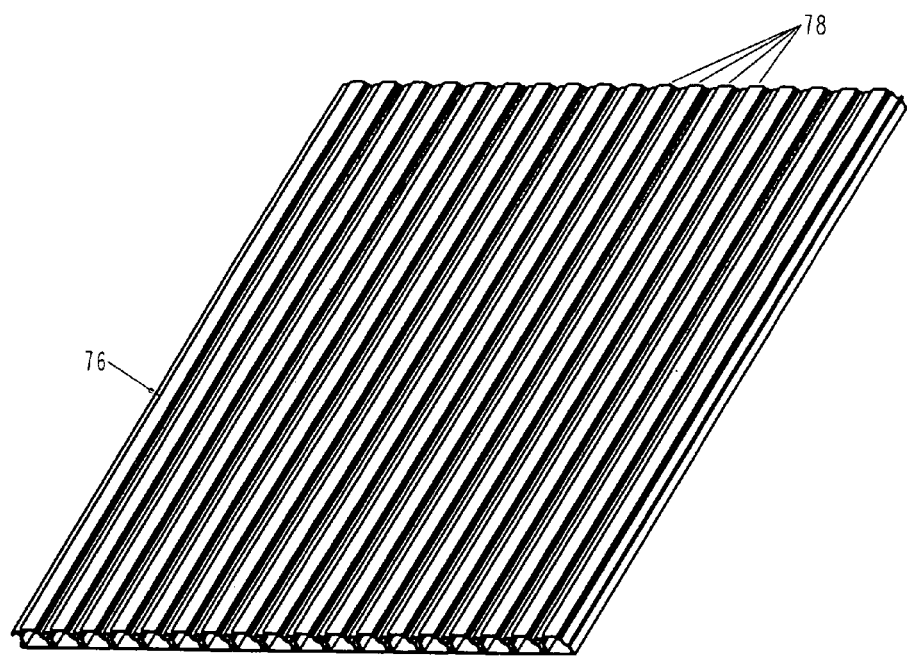
FIG. 11A is a perspective view of one embodiment of a gate with linked segments.
Figure 11B:
FIG. 11B is an enlarged partial side view of the gate shown in FIG. 11A.
Figure 11C:
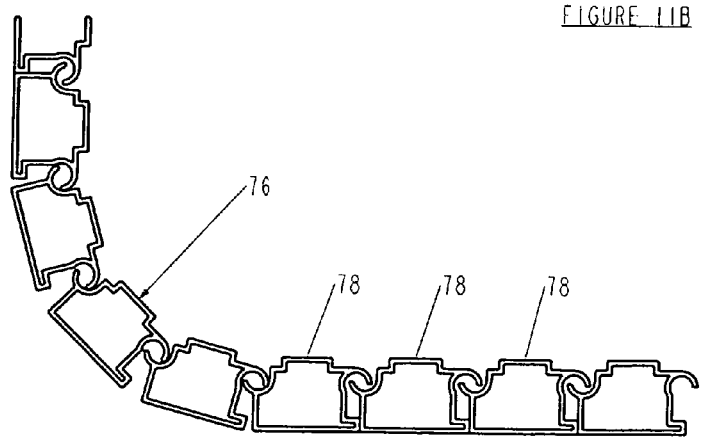
FIG. 11C is an enlarged partial side view of the gate shown in FIG. 11A in a curved position.

In FIG. 11A, there is shown a perspective view of a gate 76 having a plurality of segments 78. In FIG. 1B, there is shown a partial side view of the gate 76. FIG. 11C shows a enlarged partial schematic side view of the gate 76 with part of the gate located in a horizontal plane and part of the gate located in a vertical plane. It can be seen that part of the gate 76 curves between the horizontal plane and the vertical plane. The gate 76 is flexible laterally and rigid longitudinally and the segments 78 are individual links.

Figure 12A:
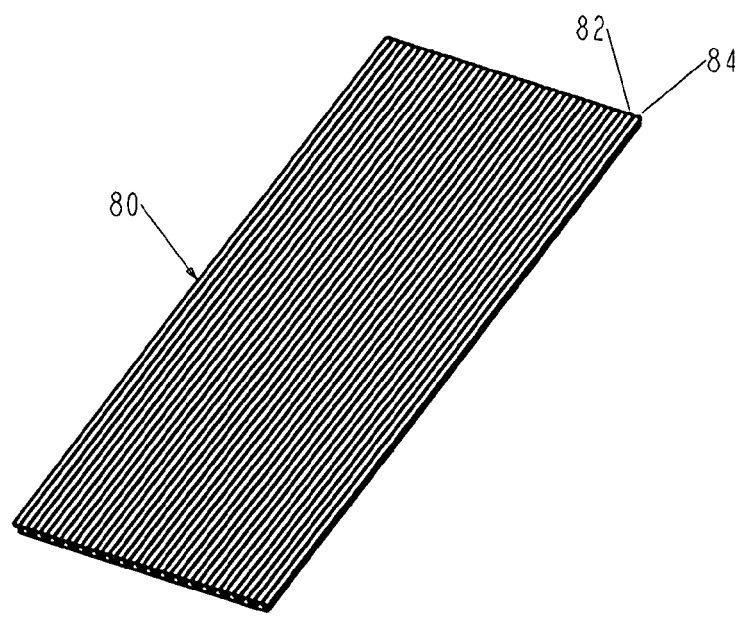
FIG. 12A is a perspective view of a further embodiment of a gate with seals between linked segments.
Figure 12B:
FIG. 12B is an enlarged partial side view of the gate shown in FIG. 12A.
Figure 12C:
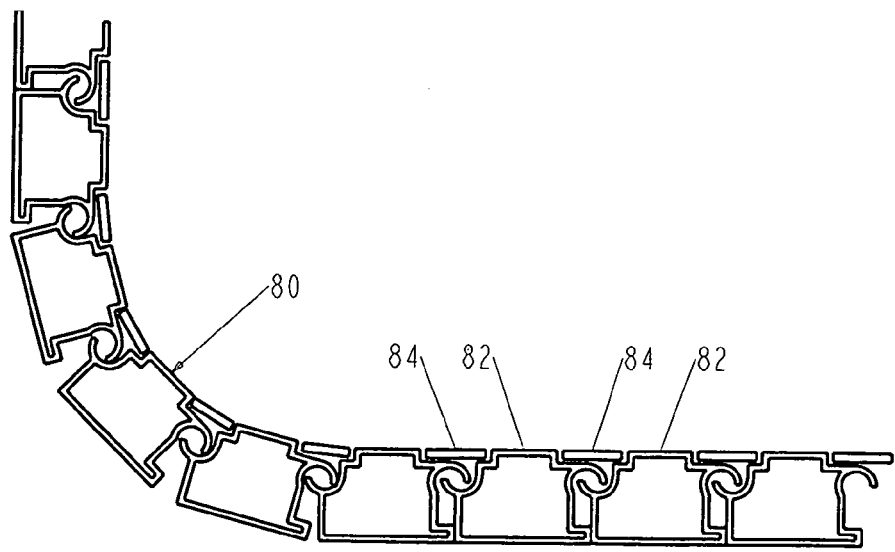
FIG. 12C is an enlarged partial side view of a linkage of the gate shown in FIG. 12A arranged in a curved position.

In FIG. 12A, there is shown a gate 80 having a plurality of segments 82. In FIGS. 12B and 12C, it can be seen that the segments 82 are almost identical in shape to the segments 78 of the gate 76 (shown in FIGS. 11A to C) except that there is a seal 84 located between each of the segments. The seal 84 prevents or reduces the possibility of bulk material entering the area between the segments and preventing the gate from curving between the horizontal plane and the vertical plane. In FIG. 12C, part of the gate 80 is in the horizontal plane and part is in the vertical plane. It can be seen that the seals 84 remain in place even as the segments proceed through the curved portion of the path. Preferably, the seals 84 are attached to the upper or forward segment and not attached to the immediately adjacent lower segment.

Figure 13A:
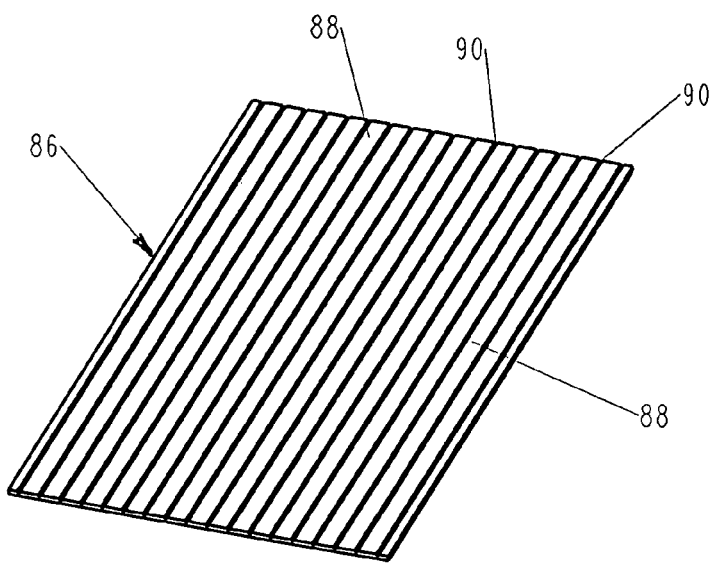
FIG. 13A is a perspective view of a further embodiment of a gate made of plastic material that is shaped to bend in one direction.
Figure 13B:
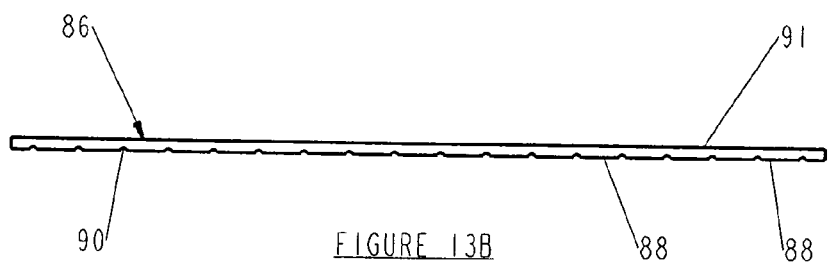
FIG. 13B is an enlarged partial side view of the gate shown in FIG. 13A.
Figure 13C:
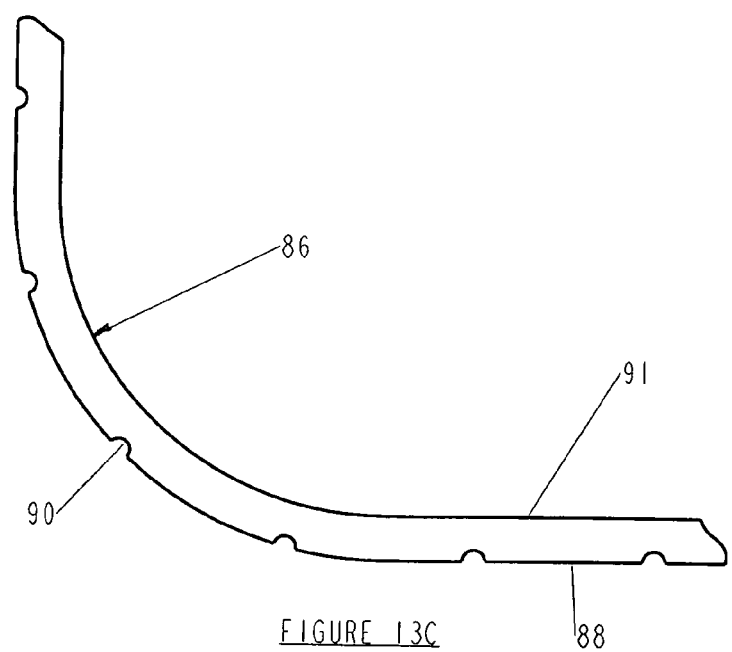
FIG. 13C is an enlarged side view of the type of gate shown in FIG. 13A arranged in a curved position.

In FIG. 13A, there is shown a perspective view of a bottom surface of a gate 86 having a plurality of segments 88 that can flex relative to one another. In FIG. 13B, the gate 86 is shown in an upright position with the bottom surface facing downward. Spaced channels 90 are located in the bottom surface only so that an upper surface 91 is smooth. In FIGS. 13B and 13C, it can be seen that the gate 86 is made from a flexible plastic material with spaced channels 90 formed therein to enable the gate to flex between the horizontal plane and the vertical plane.

Figure 14A:
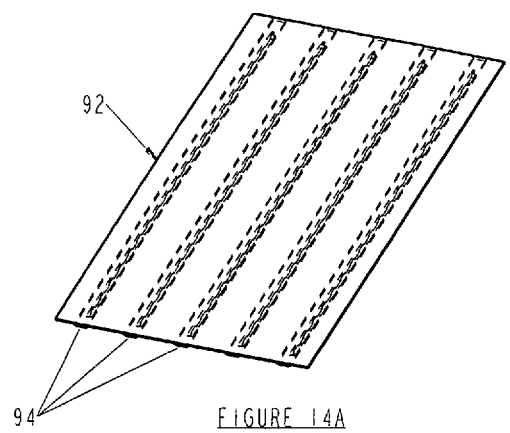
FIG. 14A is a perspective view of a T-bar supported gate.
Figure 14B:
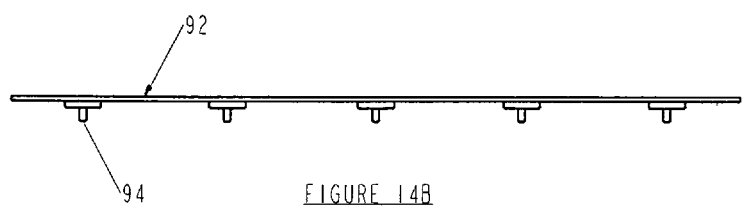
FIG. 14B is a side view of the gate in FIG. 14A.
Figure 14C:
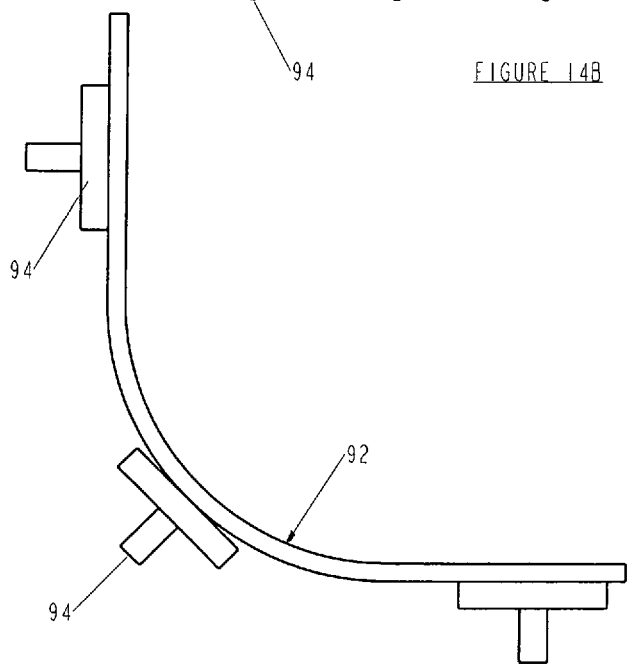
FIG. 14C is an enlarged partial side view of the gate shown in FIG. 14A arranged in a curved position.
Figure 14D:
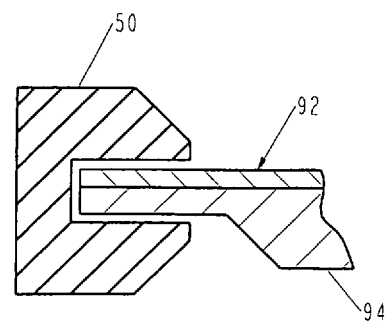
FIG. 14D is a partial sectional view of the gate of FIG. 14A located in a guide.
Figure 15A:
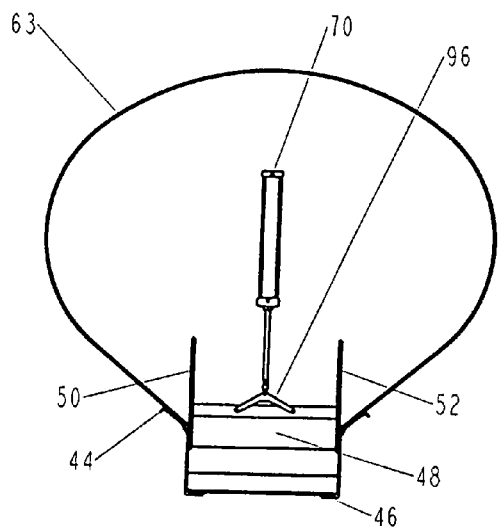
FIG. 15A is a schematic front view of a shorter version of a gate assembly operated by an air cylinder where the gate is in a closed position.
Figure 15C:
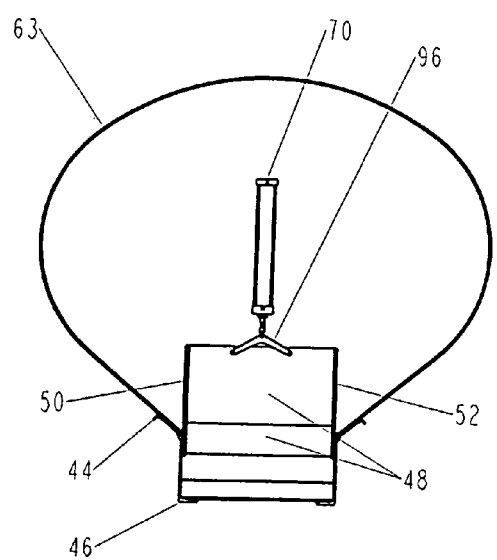
FIG. 15C is a schematic perspective view of the gate assembly of FIG. 15A.
Figure 15B:
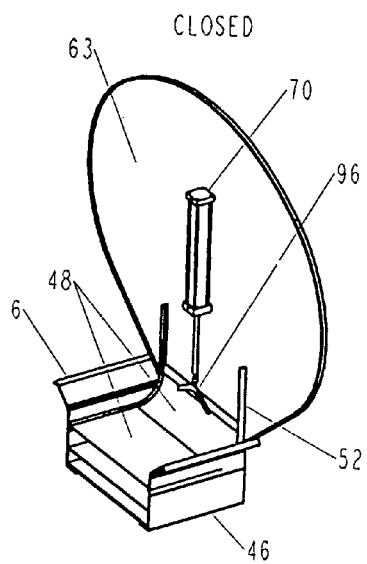
FIG. 15B is a schematic front view of the gate assembly of FIG. 15A where the gate is in an open position.
Figure 15D:
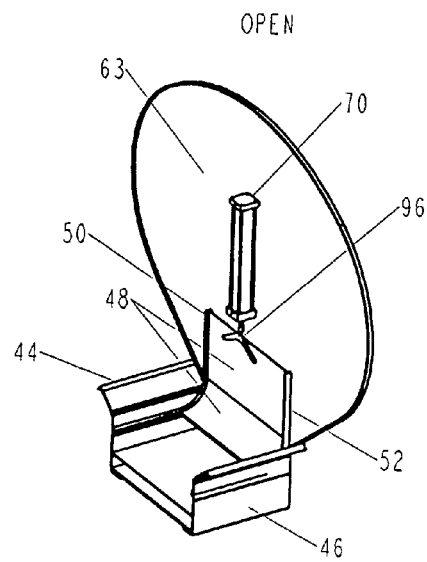
FIG. 15D is a schematic perspective view of the gate assembly of FIG. 15B.

In FIG. 14A, there is shown a further embodiment of a gate 92 with lateral supports 94 extending laterally beneath the gate 92. It can be seen from FIGS. 14B and 14C that the lateral supports 94 have a T-shaped cross section. It can be seen that in the curved portion, the support 94 separate slightly from the gate 92. In FIG. 14D, it can be seen that the support 94 tapers at an edge of the gate to allow the support to fit within the channels 50, 52 (only one of which is shown in FIG. 14D).

It can further be seen from FIGS. 11C, 12C, 13C and 14C that when part of the gate is in a vertical position and part of the gate is in a horizontal position, there remains a part of the gate that it is in a curved position between the vertical and horizontal positions.

In FIGS. 15A, 15B, 15C and 15D, there is shown a further embodiment of the gate 48 that is operable by means of an air cylinder 70. The air cylinder 70 operates a bracket 96 that moves the gate between a closed position shown in FIGS. 15A and 15B and an open position shown in FIGS. 15C and 15D. The gate is designed for use with hoppers having a shorter width than hoppers used with the gate shown in FIGS. 8A to 8F. In the open position, the gate assembly of the present invention allows the opening to extend substantially the entire distance along with width of the hopper. The same reference numerals are used in FIGS. 15A to 15D as those used in FIGS. 8A to 8E to describe those components that are identical.

When an air cylinder is used to open and close the gate, the gate can be opened further than when sprockets are used. For example, in the open position, the gate can be located entirely in the vertical plane. When sprockets are used, part of the gate must always be in contact with part of the sprockets so that the gate can continue to operate.

Since the sprockets are located on what is the curved portion of the gate between the horizontal plane and the vertical plane, part of the gate must always occupy that curved position.

Figure 16:
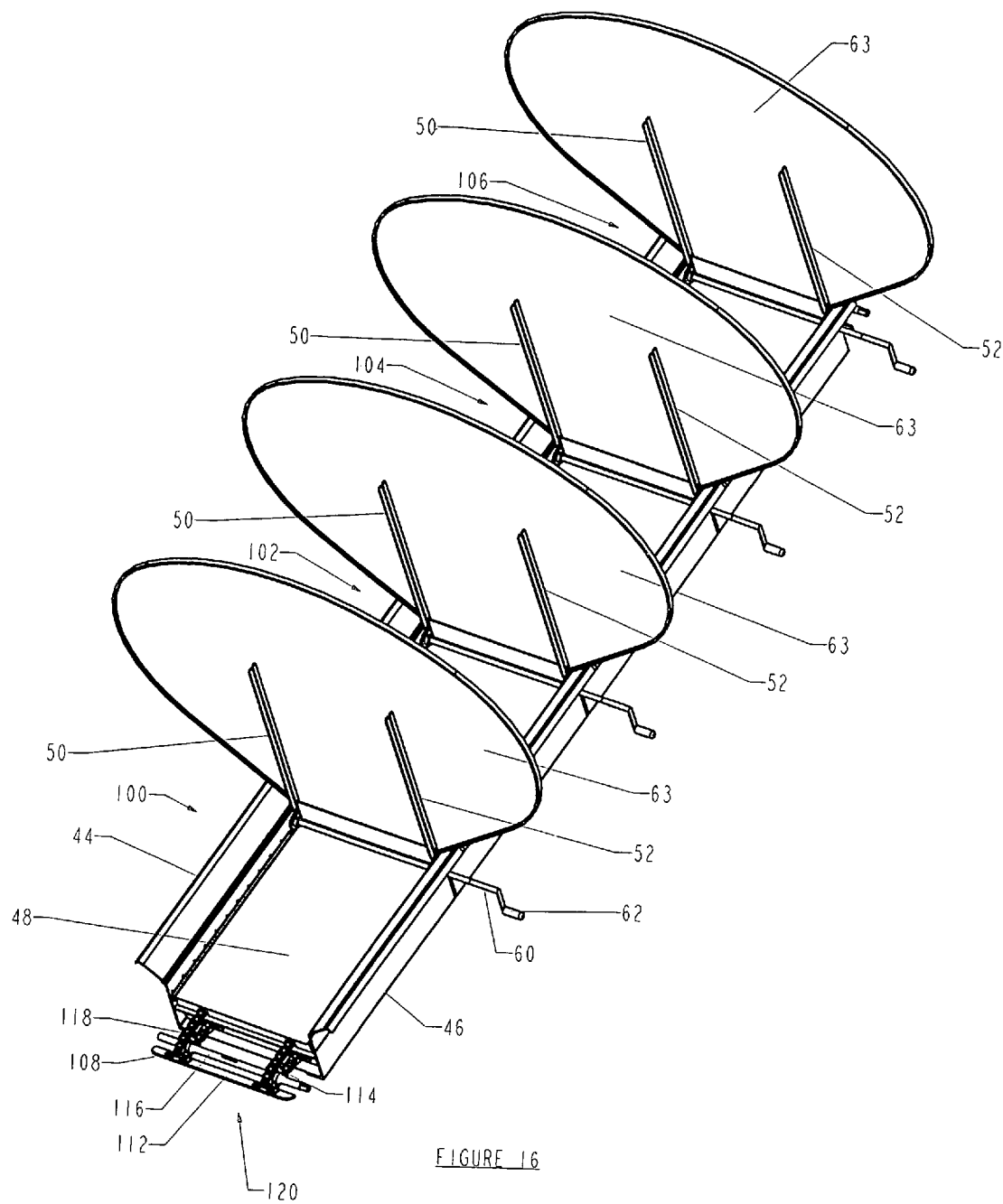
FIG. 16 is a schematic perspective view of four gate assemblies located adjacent to one another.
Figure 17A:
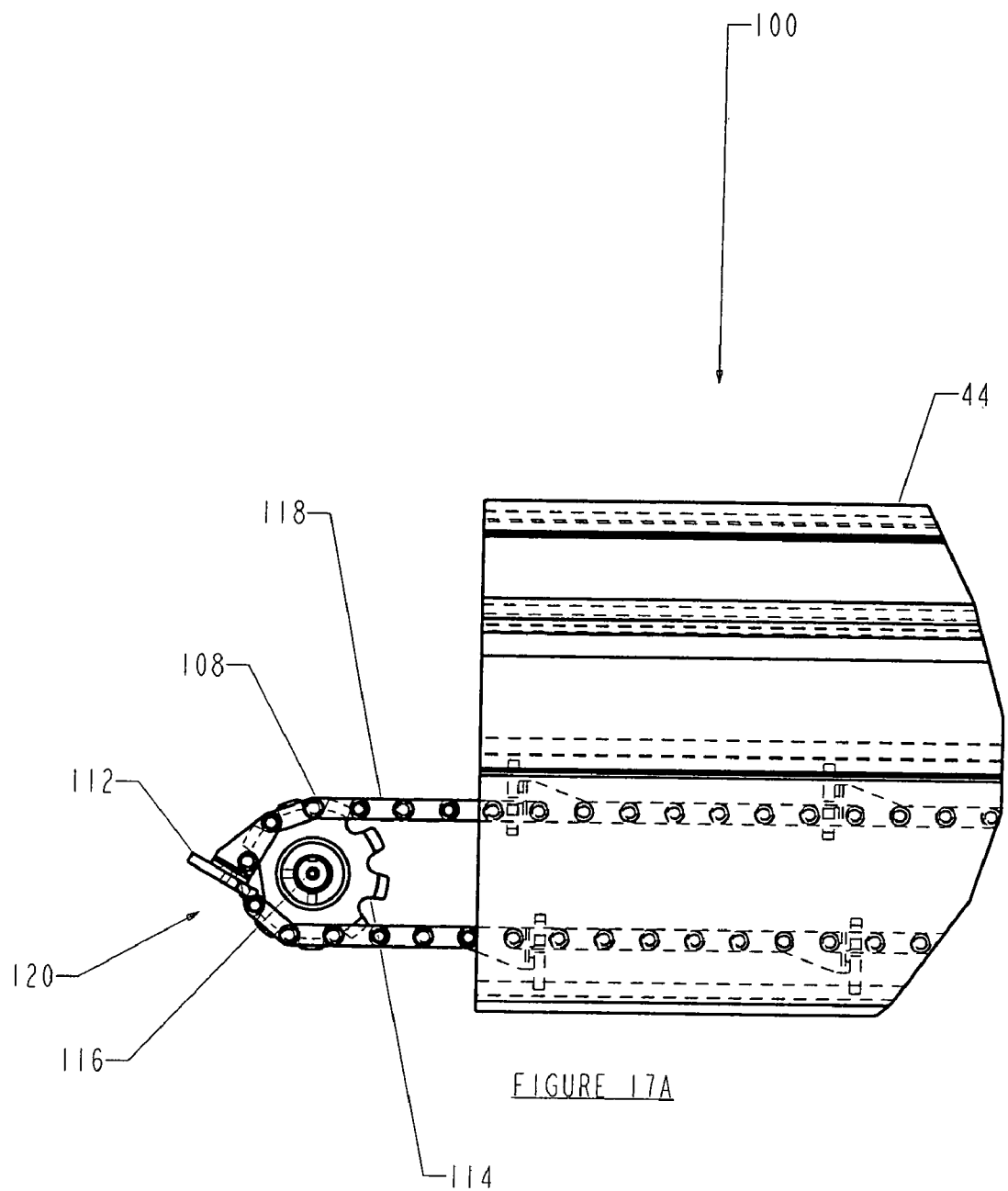
FIG. 17A is a partial side view of one end of the gate assembly of FIG. 16.
Figure 17B:
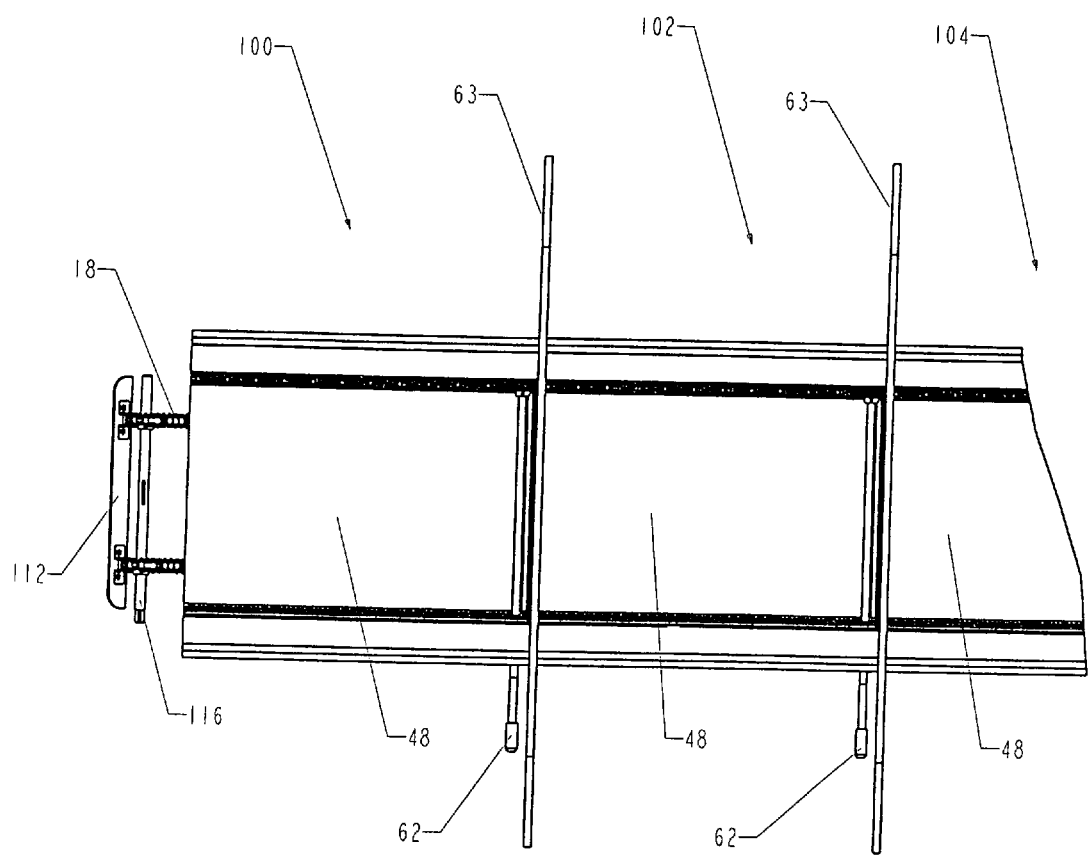
FIG. 17B is a partial top view of the gate assembly of FIG. 16.
Figure 17C:
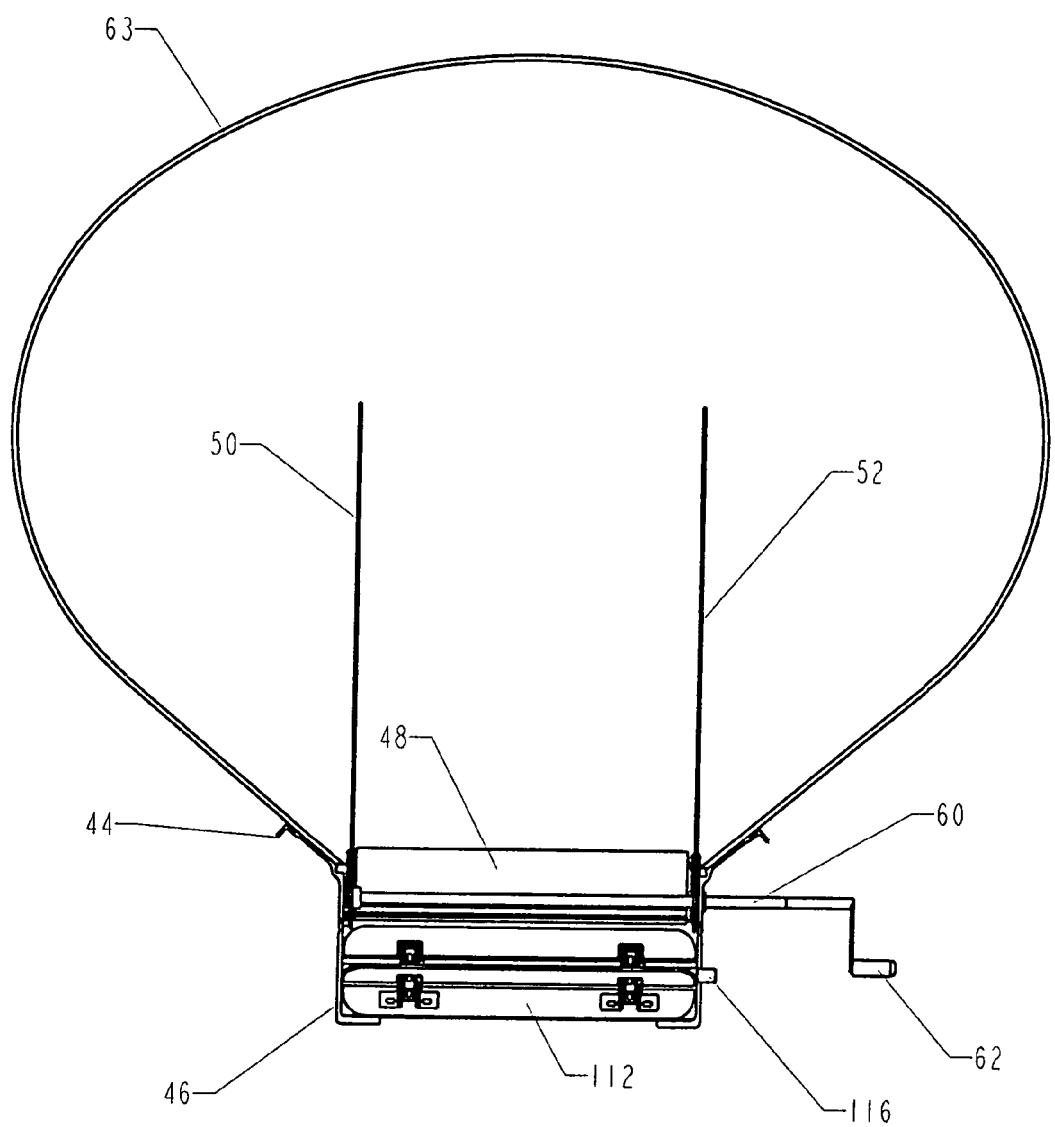
FIG. 17C is a schematic front view of the gate assembly of FIG. 16.

In FIG. 16, there are four gate assemblies 100, 102, 104, 106. The gate assemblies are similar to the gate assembly 42 shown in FIG. 6 and the same reference numerals will be used as those used in FIG. 6 for those components that are identical. The guides 50, 52 extend along each side of the frame 46 and up the divider 63 at the end of the frame 46. Beneath the gates 100, 102, 104, 106 is a conveyer 108 having a plurality of blades 112 (only one of which is shown). Sprockets 114 on a shaft 116 with continuous chains 118 pull the blades 112 to an outlet 120. The outlet can be at a front or rear of the conveyor 108. Various types of conveyors or other means to move material from a gate to an outlet will be suitable. It can be seen that each gate can be opened independently of all the other gates. If desired, two or more gates can be opened at the same time. All of the gates shown are in a closed position.

In FIGS. 17A, 17B, 17C and 17D, there is shown an enlarged partial side view, a partial top view, a front view and a partial side view respectively. The same reference numerals are used in FIGS. 17A, 17B, 17C and 17D as those used in FIG. 16 for those components that are identical.

Figure 18A:
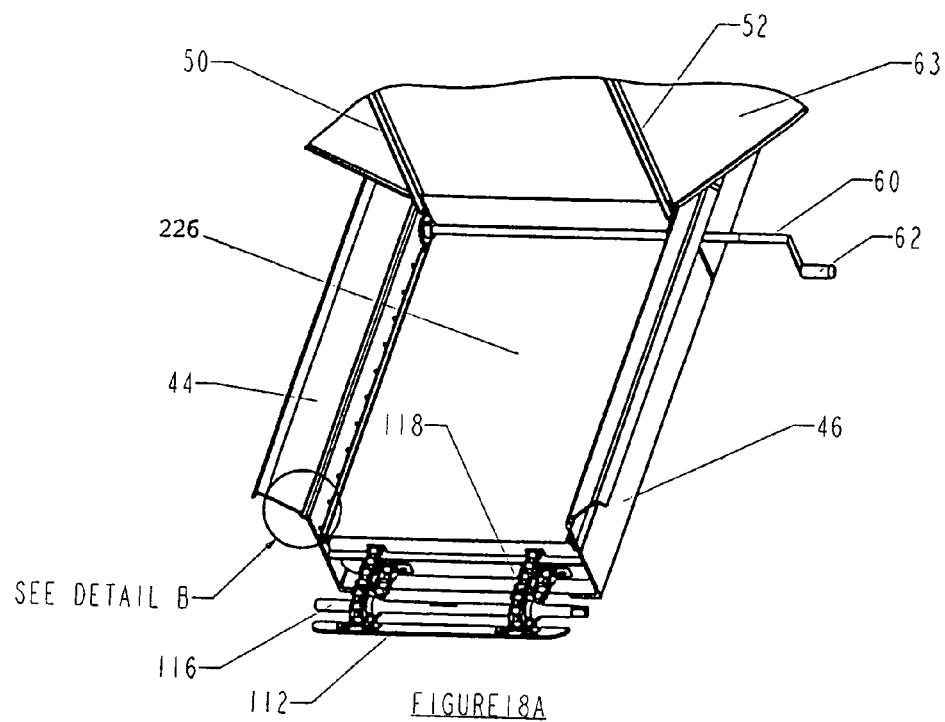
FIG. 18A is a partial perspective view of the four gate assembly shown in FIG. 16.
Figure 18B:
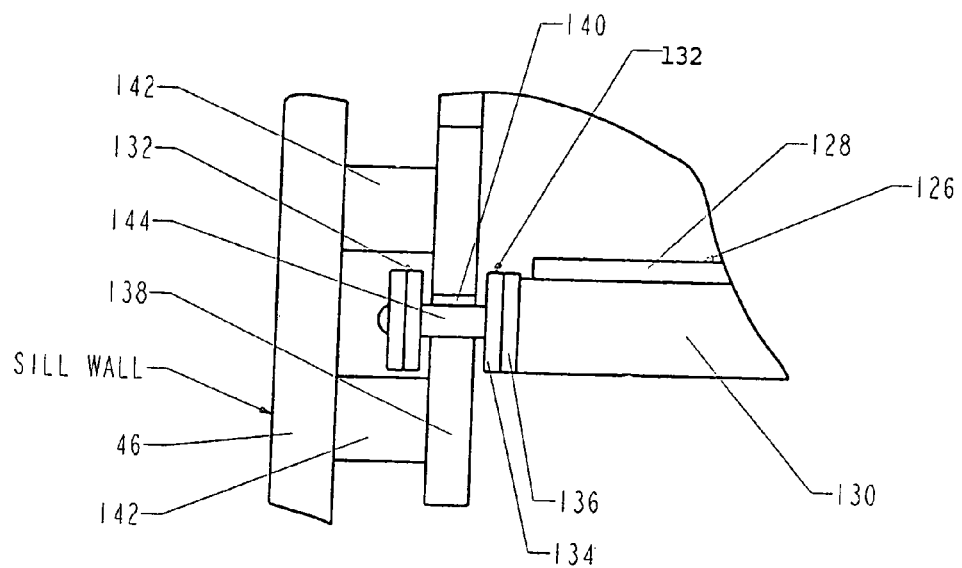
FIG. 18B is a partial enlarged front view of a chain mounted in a guide for the gate assembly shown in FIG. 18A.

In FIG. 18A, there is shown a partial perspective view of the gate assembly 100 from FIG. 16 with an enlarge partial front view shown in FIG. 18B of a connection between the edge of the gate and the guide. A gate 126 has a plastic cover 128 with support bars 130 (only one of which is shown) extending laterally beneath the cover 128. A chain 132 having links 134, 136 is affixed to the ends of each support bar 130. The links 134, 136 have an I-shaped cross section. A guide 138 is mounted on the frame 46. The guide has a gap 140 that is spaced apart from the frame 46 by spacers 142. A narrow portion 144 of each link 134, 136 fits within the gap 140. The links 134, 136 are movable relative to the guide 138. If sprockets are used to open and close the gate, the sprockets can have projections that fit within an appropriate opening within each of the links (not shown in FIG. 18). The sprockets can be operated manually using a crank or they can be connected to an appropriate motor (not shown) and power operated. The L-shaped baffle extending horizontally from the inside of the hopper 44 and downward onto the surface of the gate 126 has been deleted to expose the chain 132. As described previously, the baffle closes off the openings around the side edges of the gate to prevent particulate material from escaping from the hopper when the gate is closed.

When used in this specification, the term "gate" includes the edges of the gate that fit within the guide means, whether or not those edges are made from a different material or different components from a central portion of the gate. "Edges" includes linkages that are affixed to the gate to provide ways for opening and closing the gate. For example, the chain 132 in FIG. 18 is an edge that is part of the gate 126.

I claim:

1. A gate assembly for a hopper of a transport vehicle, said hopper containing particulate material, said gate assembly comprising a frame supporting a gate, said gate having two edges, said frame having two opposing sides with guides thereon, each guide extending along one of said opposing sides, said guides being sized to receive said edges of said gate, there being one edge in each guide, said guides extending upward at one end of said frame into said hopper, said gate being rigid enough to support said particulate material when said gate is in a closed position, yet flexible enough to move longitudinally between a first plane in said closed position and a second plane in an open position, said date being located at a base of said hopper, said gate having an outlet located beneath said gate, said particulate material being able to flow by gravity through said gate when said gate is in said open position.

2. A gate assembly as claimed in claim 1 wherein said gate is rigid longitudinally to support said particulate material when said gate is in said closed position and sufficiently flexible laterally to enable said gate to move longitudinally between said first plane and said second plane.

3. A gate assembly as claimed in claim 2 wherein said gate is constructed to move substantially between said first plane and said second plane, said guides having a U-shaped cross section.

4. A gate assembly as claimed in claim 1 wherein said first plane is at least 45 degrees apart from said second plane.

5. A gate assembly as claimed in claim 2 wherein said second plane is substantially 90 degrees apart from said first plane.

6. A gate assembly as claimed in claim 1 wherein said gate is constructed of one of plastic material, links that extend laterally across the gate, plastic material supported by lateral support bars, and links that extend laterally across the gate with a seal to prevent particulate material from entering an area between the links.

7. A gate assembly as claimed in claim 6 wherein said lateral support bars have a T-shaped cross section.

8. A gate assembly as claimed in claim 6 wherein said gate is made with said links, said links together having a smooth upper surface.

9. A gate assembly as claimed in claim 5 wherein said edges of said gate have openings therein that are located within said guides, said openings providing traction for components that are used to open and close said gate.

10. A gate assembly as claimed in claim 6 wherein the gate is opened and closed manually using a crank or the gate is opened and closed by a motor or by a hydraulic cylinder or a pneumatic cylinder.

11. A gate assembly as claimed in claim 6 wherein there is more than one hopper and there is one gate assembly for each hopper with partitions between adjacent hoppers, a second plane of the guides extending upward immediately adjacent to the partition for that hopper.

12. A gate assembly and a hopper of a transport vehicle in combination, said hopper containing particulate material, said combination comprising a frame supporting a gate, said gate having two side edges, said frame having two opposing sides with guides thereon, each guide extending along one of said opposing sides, each guide being sized and shaped to receive one side edge of said gate, said guides extending upward at one end of said frame into said hopper, said gate being rigid enough to support said particulate material when said gate is closed, yet flexible enough to move longitudinally relative to said guides between a closed position and an open position, said gate being located at a base of said hopper.

13. A gate assembly for a hopper of a transport vehicle, said hopper containing particulate material, said gate assembly comprising a frame supporting a gate, said gate having two side edges and two ends, said frame having two opposing sides with guides thereon, each guide extending along one of said opposing sides, said guides being sized and shaped to receive said side edges of said gate, there being one side edge in each guide, said guides extending upward at one end of said frame into said hopper, said gate being rigid longitudinally and flexible laterally to enable said gate to move longitudinally between an open position and a closed position, said gate having an outlet located beneath said gate.

14. A gate assembly for a hopper of a transport vehicle, said hopper containing particulate material, said gate assembly comprising a frame supporting a gate, said gate having two side edges and two ends, said frame having two opposing sides with guides thereon, each guide extending along one of said opposing sides, said guides being sized and shaped to receive said side edges of said gate, there being one edge in each guide, said guides curving smoothly upward into said hopper from one end of said frame, one end of said two ends of said gate being a leading edge as said gate is being opened and a remaining end of said two ends being a leading edge as said gate is being closed, said gate being located at a base of said hopper, said leading edge being strong enough to cut through said particulate material as said gate is being closed.

15. A gate assembly as claimed in claim 14 wherein said gate has an outlet located beneath said gate.

16. A gate assembly as claimed in claim 7 wherein said lateral support bars are located on a lower surface of said gate.

17. A gate assembly as claimed in claim 6 wherein said gate has a smooth upper surface.

18. A combination as claimed in claim 12 wherein said gate has an outlet located beneath said gate.

19. A combination as claimed in claim 12 wherein said gate is located in said hopper adjacent to a side wall thereof when said gate is in said open position.

20. A gate assembly as claimed in claim 13 wherein there is a baffle extending inwardly from each side of said hopper and downwardly to an upper surface of said gate when said gate is in a closed position to prevent particulate matter from escaping around said side edges of said gate.

* * * * *